United States Patent [19]

Weber

[11] Patent Number: 5,159,255
[45] Date of Patent: Oct. 27, 1992

[54] ENERGY CONSERVING ELECTRIC INDUCTION MOTOR FIELD CONTROL METHOD AND APPARATUS

[75] Inventor: Harold J. Weber, Holliston, Mass.

[73] Assignee: Savvy Frontiers Patent Trust, Holliston, Mass.

[21] Appl. No.: 610,035

[22] Filed: Nov. 7, 1990

[51] Int. Cl.$^5$ .............................................. H02P 1/44
[52] U.S. Cl. .................................... 318/775; 318/790; 318/812
[58] Field of Search ............... 318/810, 729, 799, 812, 318/775, 776, 777, 809, 83, 93, 95, 785, 790, 794, 797, 526, 527, 531

[56] References Cited

U.S. PATENT DOCUMENTS

| | | | |
|---|---|---|---|
| 4,266,177 | 5/1981 | Nola | 318/810 |
| 4,313,076 | 1/1982 | Rathje | 318/797 |
| 4,355,274 | 10/1982 | Bourbeau | 318/812 |
| 4,378,520 | 3/1983 | Ford | 318/790 |
| 4,387,330 | 6/1983 | Zigler | 318/797 |
| 4,533,857 | 8/1985 | Chang et al. | 318/729 |
| 4,806,838 | 2/1989 | Weber | 318/775 |
| 4,823,067 | 4/1989 | Weber | 318/799 |
| 5,013,990 | 5/1991 | Weber | 318/812 |

OTHER PUBLICATIONS

Book: "Modern Refrigeration and Air Conditioning" by Althouse, et al; published by The Goodheart-Wilcox Company, Inc.; South Holland, IL; pp. 218-219 and 261-262 as cited in text of specification.

Primary Examiner—William M. Shoop, Jr.
Assistant Examiner—John W. Cabeca

[57] ABSTRACT

An alternating current induction motor having a tapped RUN winding for developing different levels of stator field excitation which induces rotational torque into a rotor having an output member that drives various levels of mechanical load. Instant motor loading is sensed as a change in power factor or subsynchronous slip speed and the level of RUN winding excitation, together with the resulting magnetic field strength, is immediately changed to compensate for the sensed load changes. The change in RUN winding excitation is brought about by having a RUN winding the full extent of which may be coupled with a.c. power to produce magnetic field strength and resulting output member torque at least sufficient to operate the motor under minimum load conditions, and at least one tapped portion of the RUN winding which may be alternatively coupled with the a.c. power to produce an increased level of magnetic field strength necessary for operating the motor under maximal, or at least an increased level of motor loading.

20 Claims, 12 Drawing Sheets

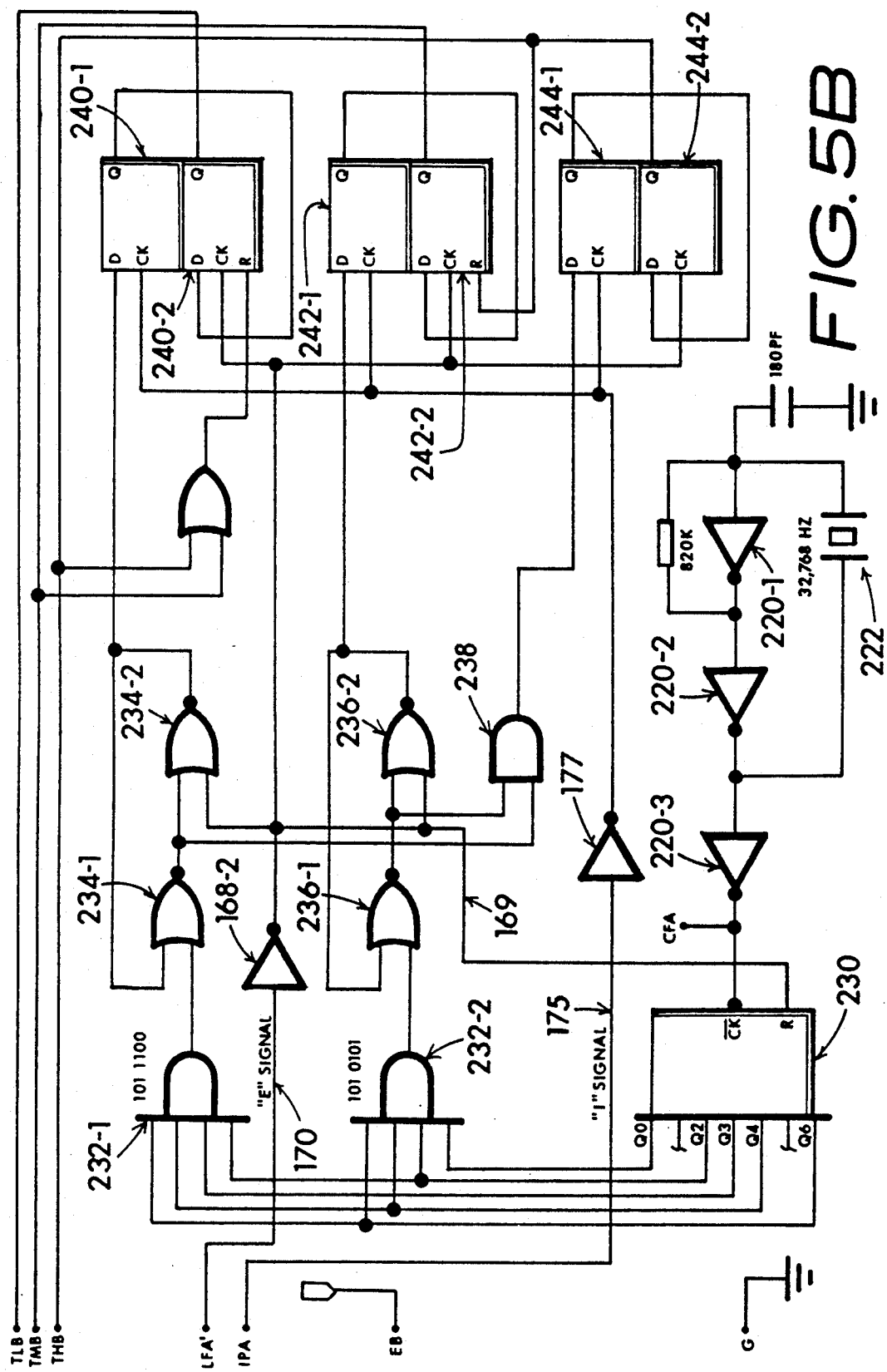

ENERGY CONSERVING ELECTRIC INDUCTION MOTOR FIELD CONTROL METHOD AND APPARATUS

FIELD OF INVENTION

The invention relates to the field of alternating current (a.c.) electric induction motors, particularly of the larger sized fractional horsepower and integral horsepower "squirrel cage" rotor variety, which commonly run at a subsynchronous speed. Single phase motors of this type ordinarily have a START winding and a RUN winding, while polyphase (e.g., 2 and 3-phase) motors of this type have an effectively separate RUN winding for each phase. In a general sense, the field of the invention pertains to load dependent controlled operation of a novel configuration of such motors in order to obtain significant ENERGY SAVINGS.

BACKGROUND OF INVENTION

Electric induction motors are by far the most common, popularly used form of a.c. motor. They find ubiquitous application in refrigerators, air conditioners, major appliances, and a host of other machine applications. When fully loaded, induction motors may be designed to exhibit exceptionally good efficiency and quiet, long-term operation with negligible maintenance. The art of induction motor manufacture is so highly developed that a wide variety of motors are routinely made for all sorts of applications with such motors providing predictable performance characteristics and low unit cost.

While efficiency of induction motors may be readilly maintained at a high level when driving a full load, they also have notorious inefficiency problems when unloaded or lightly loaded. Ordinary induction motors literally waste a large percentage of their electrical power consumption as unecessary heat when they are delivering intermediate levels of output member (drive shaft) torque. It is this area of ENERGY waste which occurs under operating conditions that present less than a full load to the motor which has been previously addressed by several of my earlier inventions and remains the technical area which continues to be improved upon by my instant invention.

Refrigerations and air conditioners are two of the most prodigious producers of unecessary electrical ENERGY WASTE that, to a substantial extent, is caused by induction motor losses. As is well known, common hermetic compressors used in refrigerators utilize small induction motors ordinarily rated between about 1/6 and ½ horsepower for operation. Motor design is dictated to a large extent by engineering windings that develop sufficient magnetic field strength to produce adequate running torque in the motor under worst case conditions of high compressor loading, typical of extreme climatic conditions of heat and humidity. Obviously a motor carefully designed so as to be adequate for extreme climatic conditions will be considerably over-rated under milder conditions.

Domestic refrigerators, as a categorical induction motor application, are known to consume about 7% of the total amount of electric energy produced in the United States. More significantly, these same domestic refrigerators claim about 20% of the electrical consumption of the average household. As a result of this, a mere 14% improvement in refrigerator motor operating efficiency would unburden our nation's electric power grid by about one percentage point. Said another way, one out of every one hundred power plants could be "turned off" if this mere 14% efficiency improvement were in place in every domestic refrigerator. Air conditioners are even bigger energy hogs, particularly in summertime and in warmer regions of the nation. Energy consumption by air conditioners may dwarf all other uses, particularly when weather is severely hot and/or humid. It also behooves the layperson, if not the practicing artisan, to realize that the true mechanical load presented to the typical air conditioner motor varies widely, depending upon ambient air temperature, humidity, heat-load changes, and so forth. Again as with refrigerators and other appliance applications, induction motors intended for air conditioner use are intentionally over-rated (over designed) to accomodate "worst case" scenarios, while in fact they may ordinarily operate under conditions demanding much less motor running torque.

Operating an induction motor with magnetic field strengths nearing the stator core material saturation level is a common operating mode in modern motor design, where the central goal is to get the most torque for the least unit cost. High flux densities are often obtained from windings having a minimum of copper (e.g., reduced circular mil wire cross-section) in order to cut cost and weight, particularly with the advent of modern high temperature insulating materials. The net result is a motor field which runs hot and with low efficiency under all but full load running conditions. As is well known, when an induction motor is unloaded (e.g., the instant driven mechanical load ordinarily coupled with the output member is reduced or decoupled) it produces a corresponding decrease in power factor. While in theory this reduction in power factor with the current lagging the voltage phase by perhaps 30 to as much as 70 degrees or so can cut true power consumption (e.g., power actually drawn from the source), it must be realized that the apparent power (the product of voltage and current flowing through the motor winding) still remains high. An artisan familiar with the ramifications of power factor changes in an a.c. induction motor circuit knows that power draw from the a.c. line is of course reduced as the load coupled with the motor is reduced, but that the proportional reduction in a.c. line power wattage draw is not nearly so strong as what ought to be obtained in view of the extent of mechanical load reduction. What actually happens is that the "apparent" level of circulating current through the field windings continue to set up magnetic flux fields in the stator core which bring about almost as much eddy current and hystersis loss as what is produced when the motor is fully loaded. Additionally, this same current continues to produce resistive losses in the windings, a so called "copper loss" which results in a considerable level of heating sometimes approaching the heating that occurs when the motor is fully loaded.

An example quickly makes this problem apparent. A General Electric model 35JN23X motor draws about 6.6 amperes from an 117 volt source while providing ⅓ horsepower. Power factor is about 82%, and knowing that one horsepower equals 746 watts, the motor performance appears as:

$$((117 \text{ v} \times 6.6 \text{ a}) \times 82\%)/100 = 633 \text{ watts}$$

$$((746 \text{ w}/3)/633 \text{ w}) \times 100 = 39\% \text{ efficiency}$$

$$((100-39\%)\times 633 \text{ w})/100 = 386 \text{ watts waste power}$$

Under about 25% "partial load", this same motor continues to draw an apparent current of about 5.1 amperes albeit the power factor appears to drop to about 40%, resulting in about:

$$((117 \text{ v} \times 5.1 \text{ a})\times 40\%)/100 = 238 \text{ watts}$$

$$((746 \text{ w}/3)\times 25\%)/238 \text{ w} = 26\% \text{ efficiency}$$

$$((100-26\%)/100)\times 238 \text{ w} = 176 \text{ watts waste power}$$

It would be better if the apparent current draw (said as 5.1 amperes) were considerably reduced when the load is light. This apparent level of current flows through the windings of the motor field, inducing magnetic fields in the structure. It is the energy returned by the inductance of the motor which lowers the power factor and keeps power draw down. However, this same level of apparent current flow produces copper losses in the winding in the form of "IR" heating losses. Additionally, the flux field induced in the field core produces considerable eddy current losses in the iron (silicon steel) making up core structure. Indeed, substantially reducing (such as "halving") the current draw under light or no load conditions is known to bring about considerable savings in both of these common areas of power loss. I have found that lower winding current under reduced motor load can be readily obtained by increasing the winding inductance. Such operation with increased winding inductance is correlational with having otherwise reduced the applied motor voltage coupled with an unmodified winding under conditions of reduced or no load.

As well known to artisans, the ampere-turn relationship of the winding is a principal determinant of magnetic flux levels in a motor's field structure. Therefore, a mere 10% increase in turns-count increases the effective inductance about 21%, and results in about a 10% decrease in overall ampere-turn excitation level. A BASIC computer routine may quickly show this relationship;

scribed an early effort in obtaining a reduction of power input to a less than fully loaded motor. In this early work, a.c. power to the motor's main RUN winding was simply ON or OFF. Operation was akin to that obtained with a phase angle delayed electric lamp dimmer, aside from the control signal being derived from current lag changes (e.g., relative with power factor). In this NASA invention, the sudden inrush of triac turn-ON power introduced harmonic distortion of the a.c. power flow. This distortion was found to be objectionable by others attempting to practice the invention, and considerable parasitic loss (so-called third-harmonic distortion, in particular) was introduced into the utility power grid which was thought to offset any gains which might otherwise be produced by this invention. In any event, in a build-up of Nola's configuration as essentially taught in this earlier patent I found negligible power savings between having the controller ON or OFF (e.g., bypassed) when operating an ordinary ½ horsepower split-phase motor at partial load and with actual power consumption having been measured on a Westinghouse type CS watthour meter (as ordinarily used by utility company customers). I also found the motor operation erratic and noisy, producing buzz which was probably caused by triac turn-ON.

In yet another U.S. Pat. No. 4,533,857 for "Electrical Energy Savings Device for Motors", Ten-Ho Chang et al said that savings could be obtained by measuring motor current and providing phase-angle delay of the motor power turn-ON during each half-cycle. Unfortunately, common induction motors typically maintain relatively high levels of apparent current flow even when unloaded and certainly when partially loaded. Mainly, the phase lag of the current changes. In Chang's device, only apparent current is measured and thus the scheme is inapplicable to an awful lot of ordinary cheap induction motors. Additionally, Chang's device suffers the aforesaid shortfalls which afflict Nola: that being the losses introduced by partial cycle power flow caused by phase-angle delay of power turn-ON.

I have already taught advantages which reducing

```
10    'COMPUTATION OF EFFECTIVE AMPERE/TURN EXCITATION LEVEL CHANGE
20    '(c) H. Weber 10/12/90 K1VTW      MBASIC      ATL-1.BAS
30    '------------------------------
40    INPUT "Original Number of Turns ":NTA
50    INPUT "Additional Number of Turns ":NTB
60        NTX=NTB/NTA
70        LX=1/((1+NTX) 2)
80        AT=LX*(1+NTX)
90    PRINT:PRINT "AMPERE TURN level = ";AT;"% of ORIGINAL LEVEL"
100   'finis
```

In refrigerator and air conditioner applications, any unecessary power waste under reduced load compounds itself as an unecessary increase in overall system loss. This comes about due to the configuration of the motor, where it is hermetically sealed into a module integral with a compressor. What occurs is that the heat load of the motor inefficiency is contributed to the overall refrigerant system (e.g., the Freon gas loop) where it must be disposed of through increased condensor size and additional compressor effort. In practical effect, the overall size of any given refrigeration system is substantially upscaled to accomodate waste motor power.

In U.S. Pat. No. 4,266,177 for "Power Factor Control System for AC Induction Motors", Frank Nola demotor excitation levels under all but full load provide in terms of power savings and ENERGY CONSERVATION. In U.S. Pat. No. 4,806,838 "A.C. Induction Motor Energy Conserving Power Control Method and Apparatus" issued Feb. 21, 1989 I described a motor having two sets of parallel RUN windings. A main RUN winding set is fully energized by direct connection with the a.c. power source. Through engineered design, this main RUN winding set is ordinarily sized to produce just sufficient field flux to alone operate the motor under minimum load conditions. As motor load increases, additional power is introduced into a secondary RUN winding which is wound so as to contribute to the field flux produced by the main RUN winding and result in a stronger field. The power increase in the secondary RUN winding is related to motor loading, and full a.c. power is fed to the secondary RUN winding when the motor is fully loaded. I sampled current flow through the main RUN winding with effective motor loading being determined by instant phase lag of this current flow. In other words, increased loading produces a decrease in current phase lag. Although a special motor, having multiple RUN windings, is needed to implement my earlier invention, its benefits in power savings are substantial due to reduced eddy current losses and lessened winding losses under any running conditions less than that of full load. Unlike Nola and Chang, my invention maintains substantial power flow over the full 180 degrees of every a.c. power half-cycle even when less than fully loaded. The result is at least minimal, and usually nearly negligible levels of loss caused by a.c. power distortion.

In another U.S. Pat. No. 4,823,067 issued Apr. 18, 1989 for "Energy Conserving Electric Induction Motor Control Method and Apparatus" I have again taught the use of more than one parallel RUN winding acting in concert to modulate field flux in relation to instant motor loading. In its usual embodiment, my earlier invention employs two separate RUN windings wound effectively in parallel to produce additive flux contribution to the motor's magnetic field strength. In this arrangement of my earlier invention the first RUN winding is fully excited from the a.c. power source, with the ampere/turn design of the first RUN winding engineered to alone produce sufficient field flux to ordinarily operate the motor near full subsynchronous speed under minimum load. As motor load increases, subsynchrous speed decreases introducing an increase in motor speed slip. It is this increase in speed slip that is sensed and used to determine an increase in a.c. power which may flow to the secondary RUN winding. As before, when the motor is fully loaded immediate circuit operation is established to bring about full a.c. power coupling with both RUN windings thereby producing a maximal level of field excitation and a resulting full-torque operation of the motor's rotor coupled output member.

In yet another U.S. Pat. No. 5,013,990 issued May 7, 1991 for "Energy Conserving Electric Motor Control Method and Apparatus" I further teach a reactor coupled in series between an induction motor's usual RUN winding and a.c. power source. The reactor is sized to introduce some voltage drop, typically about 10-20%, and maintain sufficient magnetic flux level in the motor's main RUN winding to keep the motor running properly under reduced load. When loading increases, motor slip speed increases or conversely power factor increases, signalling for an increase in applied a.c. power. The increase is instantly produced by shunting the voltage drop developed across the reactor by turn-ON of a triac that is in parallel with the reactor. I do show that the reactor might have one or more taps, and as such the level of instant motor power might be tailored to suit the immediate motor loading conditions. Ordinary practice of this invention requires the use of an inductor (e.g., a reactor or choke) separate from the motor, and it is the reactive voltage drop which develops across the reactor due to current flow to the motor RUN winding which produces a reduction of motor terminal voltage. As a result, the instant level of motor terminal voltage may undesirably decrease in response to increases in motor loading.

In a co-pending application Ser. No. 07/237,045 filed Aug. 29, 1988 for "Energy Conserving Electric Motor Control Method and Apparatus" I continue to describe an induction motor having a main RUN winding and a supplementary RUN winding. The main winding is fully excited by a.c. power, providing just enough magnetic flux in the field to operate the motor while driving a minimal level of mechanical load. A program ordinarily is defined for the motor's operating cycle and proportionately more or less power is simultaneously fed to the supplementary load winding to provide additional field flux necessary to overcome anticipated changes in load. Ordinarily, a microprocessor or mechanical timer device may be used to operate the motor through any predetermined cyclic sequence, while some modulation of instant levels of the programmed power changes may further be obtained by sensing real-time fluctuations in motor load.

In each of these earlier patents as well as in one of the co-pending applications, my inventions entail novel utilization of an induction motor having two usually parallel-wound mutually coupled disimilar sets of RUN windings. Ordinarily, the first or main RUN winding set is wound with 10-20% more turns than the secondary or supplementary RUN winding set. This results in increased inductance in the first RUN winding set, and reduced current. The net result is substantially reduced ampere/turn excitation of the field by the first RUN winding set. Fabricating multiple windings in an induction motor is not unusual manufacturing practice in that multi-speed motors such as a General Electric model 7HR144S (¼ hp 1725/1140 rpm 2-speed) are well known. However in these kinds of earlier designs, each RUN winding set is wound in a relatively different position (i.e., wound with angular displacement between the winding sets). For example, in this mentioned General Electric motor one winding set is positioned every 90 degrees as a 4-pole motor configuration, while the other winding set is positioned every 60 degrees as a 6-pole motor configuration. Clearly it is unusual to over-wind more than one disimilar turns count RUN winding in the same position as called for in my earlier inventions. I do strive to keep the accumulative amount of copper about the same, because my duplex main and secondary RUN windings are wound with wire having a guage substantially smaller than what a usual mono-winding requires.

In smaller motors (fractional horsepower induction motors for example like those used in refrigerators, window size air conditioners, and major appliances) utilizing multiple RUN windings such as described by my earlier inventions it became apparent that it is sometimes difficult to stuff a sufficient number of multiple winding wire turns through stator corepieces of ordinary design. This condition is particularly aggravated by "insulation buildup" on the additional turns of wire, albeit the actual amount of copper involved remains about the same in either case. Recognizing this drawback, particularly in relation to mimimal redesign of pre-existing motor structure designs, I have found that utilizing a singular winding which is initially "over wound" with sufficient end-to-end turns to operate from about 10-15% higher than design center voltage results in a motor configuration which may be readily provided with at least one tap that matches the motor to the available a.c. power voltage level and manufacture may proceed without undue complication. Alternatively, of course a motor of standard design may merely have about 10% more turns added to one end of the original winding, with the juncture serving as the "tap", and preferably with the additional turns evenly distributed over each of the several field poles. Realized also is that the wire guage in either of these configurations, at least between the common end and the tap location, must be sized sufficient to carry the full operating current of the motor drawn with line voltage applied to the tap position while the remaining turns between the tap position and the end extreme from the common end of the winding may be of substantially smaller gauge. Common art practice teaches parallel connection of motor field windings, making tapped winding facture merely an extension of old practice. Take for example ordinary 2-pole induction motors rated for 117 or 234 volts: when connected for 117 volt operation, the two field windings are parallel connected. Primarily the advantage of this configuration over my earlier work using multiple RUN windings is that much less insulation build-up is encountered in the winding core windows and obviously less turns-count is required.

Induction motors having tapped field windings are well known in the art, but for purposes alien to the fundamental purpose of my invention. Such motors, like a McGraw-Edison model 203PEG, Emerson Electric model RAK-5107, Westinghouse model 322P490, and General Electric model 5KCP39DGA931T all have tapped field windings intended to obtain speed adjustment ordinarily with the motor directly coupled with a fan blade. Since torque demand of a fan changes in proportion to speed, reducing available motor torque causes increased slip in the motor that eventually reaches a point of equilibrium where fan speed matches available motor torque. Such motors are most common in 4 and 6-pole permanent split capacitor (PSC) arrangements, as in the case of an Emerson Electric model RAK-8558 used in Whirlpool air conditioners which runs about 1,075 r.p.m. at "full speed". This represents about 10% slip and is typical of these kind of known motors. Ordinarily, engineering goals have designed these kinds of motors to normally operate with "high slip", illustrated by trade motors such as a 4-pole General Electric model 5KCP39PGB810S 4-speed PSC motor having about 10% slip as rated for 1,625 r.p.m. full-speed or a ⅓ hp Emerson Electric model K-4340 PSC motor rated for 1,420 r.p.m. having about 21% slip as used in certain Frigidaire applications.

In contrast, good quality "constant speed" motors like a Westinghouse model 312P417, Emerson Electric model 3874, and General Electric model 37NN6X operate with merely about 4% slip. Aside from these general purpose motors, "low slip" motors are also widely used in "sealed" air conditioner and refrigerator hermetic compressor unit applications, where they commonly operate around 1,725 r.p.m. and 3,450 r.p.m. from 60 hertz a.c. power.

The astute artisan recognize that I have found a novel combination of the advantages afforded by several of my earlier efforts. I bring additional reactance into play in this invention which is much like having the external reactor of my earlier copending '079 application, but without the bulk and inconvenience together with expense of the separate inductor. By switching between the motor RUN winding taps as I now do, I alter the effective motor RUN winding circuit inductance (much like selectively shunting the reactor in the copending application) and I obtain truly efficient motor power flow under a wide range of external load conditions.

SUMMARY

My invention fundamentally reflects the novel combination of low slip motor design with multitapped RUN field windings (fabricated somewhat like those provided in high slip multi-speed motors) to obtain adjustment of field excitation and resulting rotor torque in proportion to instant motor loading, with the motor speed remaining about constant and ordinarily at its most efficient point.

Motor loading is constantly sensed and changes in motor loading are used to determine which tap is selected thereby producing continual variation in the magnitude of the portion of the total field winding that is excited. The result of this action is to produce modulation of motor flux in about direct proportion to motor load. When lightly loaded, the motor field is less fully excited which substantially reduces intrinsic losses due to eddy currents in the field core and copper losses in the field windings. Usual practice of my invention includes a motor having one or more taps intermediate of the field winding ends. When minimum load is encountered, a.c. power is applied between the winding ends resulting in the most number of winding turns and highest impedance. As load increases, a.c. power is alternatively coupled between one end furthest from the tap and the tap connection which represents fewer overall turns being excited and lower impedance thereby increasing field flux density. Usually, my invention works well with a motor having field connections with taps located around 80% and 90% of the overall winding extent. It shall be realized however that more or fewer taps may be used at other tap locations depending upon the operational objectives of a specific motor design.

My invention comprises three essential functions:
a substantially constant speed and ordinarily low-slip induction motor having a multitapped field winding;
a motor load level sensing or predetermination arrangement;
a power control determination function which variously couples a.c. power to differing portions of the field winding in immediate response to changes in sensed or predetermined levels of motor loading.

I have already said that the motor portion of my invention may be provided as a unique hybrid of a low slip constant speed motor structure combined with a tapped field winding structure typical of high slip multi-speed motor designs. As such, physical manufacture of a motor suitable for my invention's application is not at all unusual, requiring no exceptional production practices and costs.

In one preferred embodiment, load sensing is obtained through determination of changes in motor current phase relative to motor voltage phase (so called power factor change). When lightly loaded, the current phase considerably lags the voltage phase. A lag of 60 degrees or more is unexceptional. In contrast, when the motor is fully loaded the lag is much less, oftimes being on the order of 15 to 30 degrees depending upon the particular design of a motor's structure. In any event, this change in lag is proportional to motor loading, with lag becoming greater as motor load lessens (and the motor appears more inductive). Although the exact design particulars as to how I obtain this sensed determination of power factor change is not the central issue of this invention, it does have illustrative import in regards to understanding my invention's underlying essence in obtaining reduced power operation when the motor load drops off. Therefore I do introduce methodology for obtaining such control utilizing contemporary elements.

In another preferred practice for my invention, I sense motor load changes as changes (albeit smallish) in true motor speed, or conversely as changes in motor speed slip. In most workhorse induction motors, speed slip is on the order of 3-6 percent. The following table represents typical motor operating speeds in relation to pole count:

| Field Poles | 60 Hz Power | | | 50 Hz Power | | |
|---|---|---|---|---|---|---|
| | Synch. Speed | Actual Speed | Slip Speed | Synch. Speed | Actual Speed | Slip Speed |
| 2 | 3600 | 3450 | 150 | 3000 | 2850 | 150 |
| 4 | 1800 | 1725 | 75 | 1500 | 1425 | 75 |
| 6 | 1200 | 1140 | 60 | 1000 | 950 | 50 |

I utilize changes in slip speed to determine motor operating levels, because it is a stronger function than true speed. In other words, a mere 3% decrease in true speed for a 4 pole 60 hertz motor running nominally at 1725 r.p.m. is 51.75 r.p.m. In terms of speed slip increase, this represents:

$$((1725 \times (3\%/100))/(1800 - 1725)) \times 100 =$$
$$(51.75/75) \times 100 = 69\%$$

or in effect over a twentyfold increase in "sensitivity" of change. Teamed with my now taught multilevel control of the induction motor's winding through instantaneous tap selection typically afforded by thyristor switches, I now achieve a here-to-fore unobtained motor performance control with a least total number of RUN winding turns count (overcoming the earlier mentioned fabrication difficulties contributed by insulation buildup in factures having separate RUN windings).

In yet another preferred technique illustrative of my invention, I teach the use of a predetermination scheme such as a microcomputer or the like, or a mechanical sequence timer, in which the motor's operating pattern is embedded in the microcomputer's memory or equivalently in the timer's cams to effectively step the motor through a pattern of expected load demand changes. In a washing machine, for example, the RUN winding tap positions may be changed depending upon which portion of a machine cycle is running. In other words, more power is provided when the washing machine is in its "agitate" cycle, while less power is provided when the motor is merely driving a pump to empty the machine's tub. I also teach that some load sensing may be included to "adapt" the machine (for example, during the "agitate" cycle) to different load demands such as might change dramatically between the washing of heavy blankets or diapers as opposed to merely washing a few pieces of lingerie. It is this combination of mapped motor operation, together with "fine tuning" provided by load sensing which may optimize an overall machine's performance and thereby bring about the conservation of considerable ENERGY.

Yet another practicable methodology for my invention utilizes a microcomputer to produce a predetermination signal that is particularly applicable to dynamic systems such as encountered with air conditioning and the like. Utilizing this technique for producing my predetermination signal, I may bring together any of many variables such as ambient temperature, humidity, time-of-day, heat load (such as lights, etc.), system pressure, and other related factors and through a program intrinsic with the microcomputer (or else provided through hard-wired logic) an instant value of predetermination signal may be derived which adjusts the instant field excitation and thus operating power of the motor to the immediate needs of a constantly changing application, thereby reducing ENERGY waste. I may further utilize dynamic load sensing such as power factor changes or slip speed changes to again "fine tune" my overall control system to obtain best ENERGY economy with least system performance sacrifice.

It is these and other benefits which the prudent artisan will promptly realize as central to the essence of my invention as now brought forth in substantial description in the remaining portions of this teaching.

DESCRIPTION OF THE INVENTION

Figure 1:
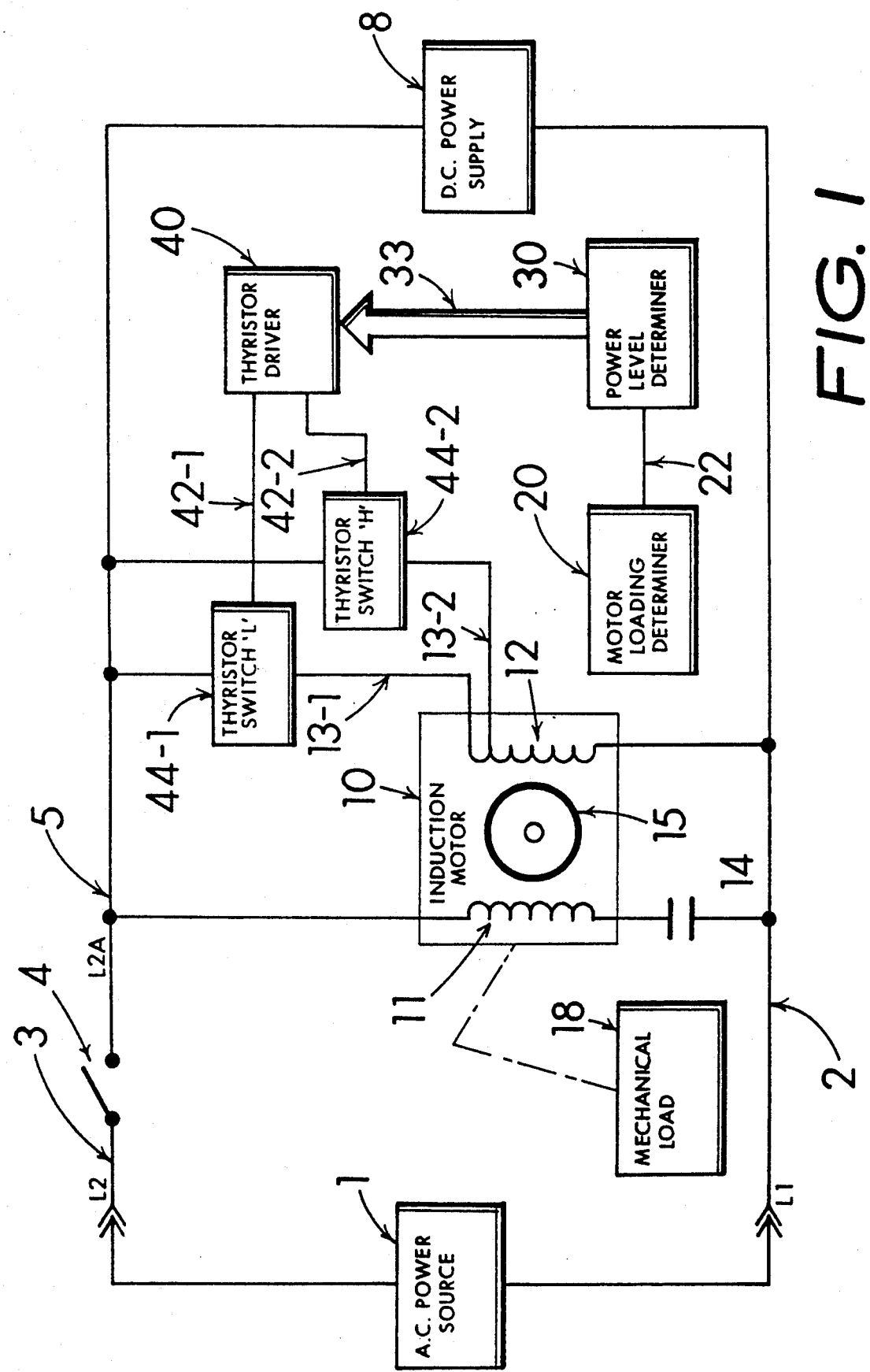
FIG. 1—Block diagram illustrating general overview of my invention.

My invention embodies an induction motor controller which is intent upon saving energy. As depicted in FIG. 1, a source 1 of a.c. power (typically 117 or 234 volts, 60 hertz in the U.S.A.) couples with terminals L1 and L2. The a.c. voltage appears between lines 2 and 3, and line 3 couples through switch 4 with line 5. In this arrangement, an induction motor 10 includes a START (or "phase") winding 11 coupled between lines 2 and 5 through a capacitor 14. The motor also includes a RUN (or "main") winding 12, one end of which couples with a.c. line 2. The RUN winding includes two taps 13-1 and 13-2 which, when excited, act together with the START winding to produce rotation of a rotor 15 that ordinarily has an output member that couples with some sort of MECHANICAL LOAD 18. A MOTOR LOADING DETERMINER 20 produces a signal on line 22 that represents instant motor loading, or torque demand, introduced by the load 18. The level of the motor loading signal cooperates with a POWER LEVEL DETERMINER 30 to subsequently produce multitudinous power level control signals through coupling bus 33 that serve to control a THYRISTOR DRIVER 40 which in turn drives (ordinarily the gate of) one or the other of THYRISTOR SWITCH 'L' or THYRISTOR SWITCH 'H'. The gated-ON thyristor in turn couples a.c. power on line 5 with one of the corresponding RUN winding tap connections 13-1 or 13-2.

Operation of the arrangement of FIG. 1 is such that, when the loading determiner 20 signals an increase of motor torque demand, thyristor switch 'H' is turned-ON resulting in an application of a.c. power between tap 13-2 and line 2. This results in a maximum level of RUN field excitation (e.g., fewer turns results in lower inductance, but higher resulting ampere-turns which is what fundamentally determines magnetization field strength) and the motor torque is increased. On the other hand, if the loading determiner 20 signals a decrease in loading (or even 'no load'), then thyristor switch 'L' 44-1 turns-ON and a.c. power is coupled with tap 13-1 (i.e., the full extent of the RUN winding that introduces increased inductance that increases the winding impedance, thereby substantially decreasing the effective ampere-turns level). Ordinarily, this decreased level of magnetic excitation of the RUN winding's field structure corresponds with a reduction in eddy current losses, winding losses, and magnetic hysteresis losses which may otherwise be of considerable magnitude. As I show, a d.c. power supply 8 may serve to 'power' the other circuit elements of my controller.

Figure 2:
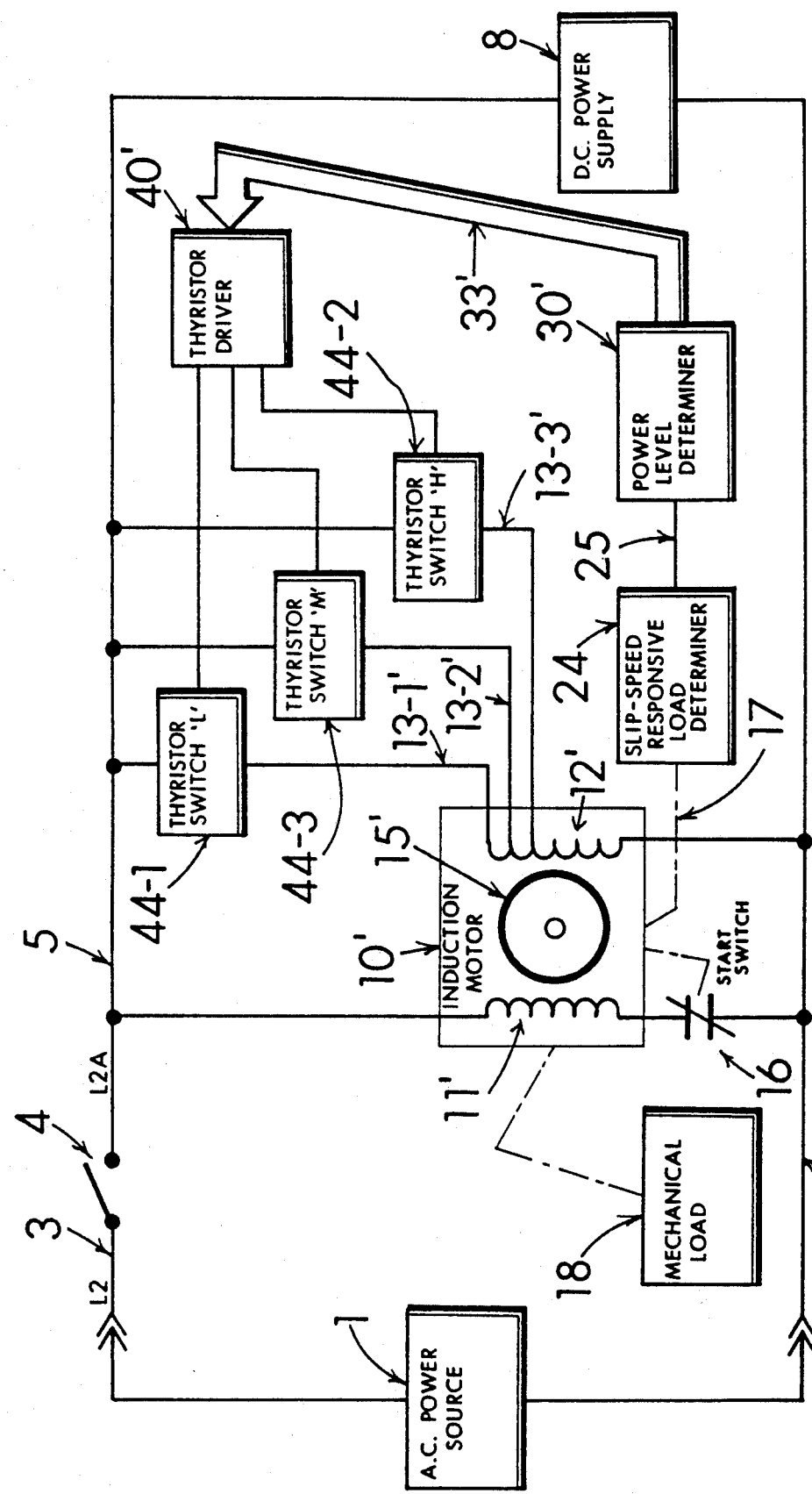
FIG. 2—Block diagram showing motor load sensing using changes in slip speed.

In FIG. 2 a split-phase induction motor 10' having a START winding 11' connected through a START switch 16, and a tapped RUN winding 12' acts to produce rotation of an output member coupled between a rotor 15' and the mechanical load 18. Motor loading is determined in this arrangement by providing a coupling of rotor rotational speed information with a SLIP-SPEED RESPONSIVE LOAD DETERMINER 24. It is the function of this element to determine changes in motor slip-speed as ordinarily caused by changes in motor loading. An increase in slip-speed may signal an increase in motor loading, while a corresponding decrease in slip-speed denotes a decrease in motor loading. The determined slip-speed error signal couples via line 25 with the power level determiner 30' that together with the thyristor driver 40' serve to control selection of any one of the three thyristor switches 44-1, 44-2, 44-3 and in turn select one of the three motor RUN winding taps 13-1', 13-2', 13-3'. Typically, when the slip speed increases beyond an upper limit the thyristor switch 'H' 44-2 is turned-ON and maximum ampere-turn energization of the motor RUN winding occurs. Conversely, when the slip speed is at a minimum as a result of minimum or no load level, the thyristor switch 'L' is turned-ON and minimum RUN winding excitation occurs. Intermediate of minimum or no load operation and full load operation, bounds on slip speed may be predetermined where the thyristor switch 'M' is turned-ON and an intermediate level of RUN field excitation occurs. Under each condition of low or medium excitation levels, considerable power savings may be had due to reduced eddy current and winding losses.

Figure 3A:
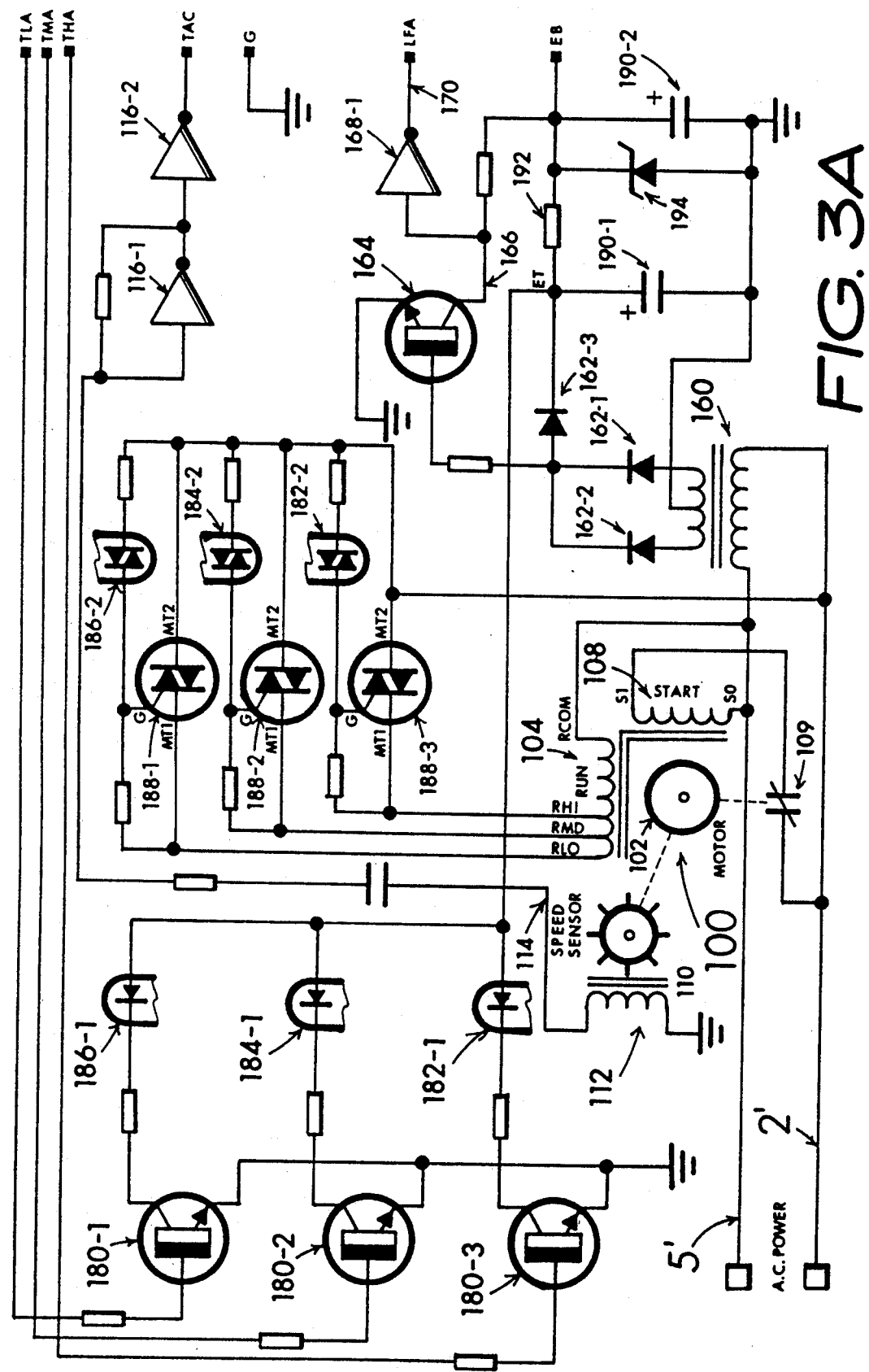
FIG. 3—Two drawing sheets 3A and 3B show electrical diagram for an embodiment of a slip speed responsive controller.

A motor 100 is provided with a START winding 108, that together with a seriate capacitor 109 couples across the a.c. power lines 2', 5' of FIG. 3A. Power also coupled with the motor's RUN winding 104 serves to produce rotation of the motor's rotor 102. The rotor 110 of a speed sensor is coupled with the motor's rotor and thereby any rotation induces a signal across the speed sensor's winding 112. This signal, as it appears on line 114 couples through cascaded amplifiers 116-1, 116-2 (such as CMOS type CD-4049) to produce an effectively "digital" signal on line TAC.

Figure 3B:
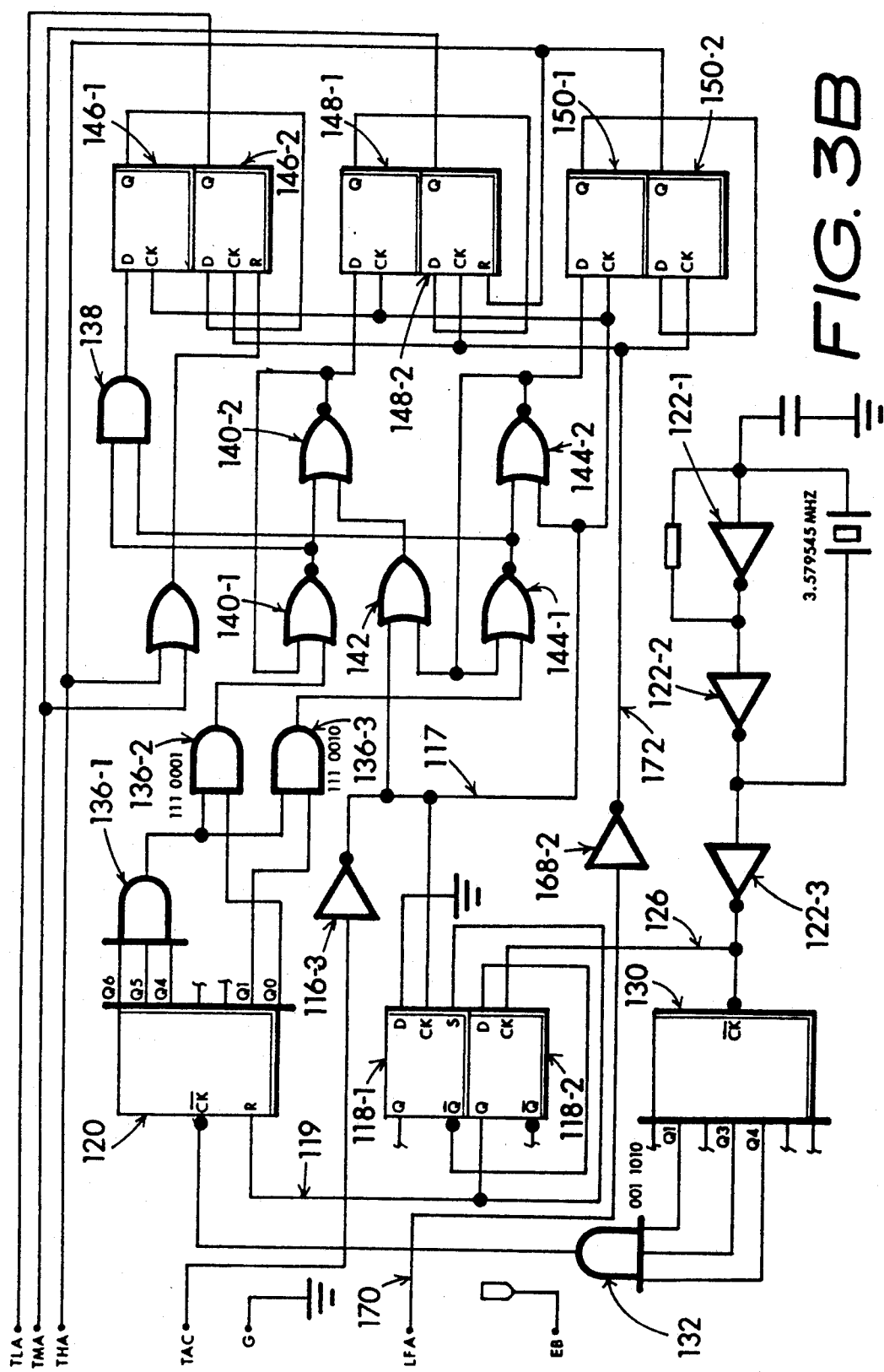

It is suggested that FIGS. 3A and 3B be placed side-by-side, showing that the signal on line TAC in FIG. 3B feeds through yet another logic inverter 116-3 and thence with the CLOCK input of a flip-flop 118-1. Flip-flops 118-1, 118-2 act as a synchronizer to produce a single narrow pulse on line 119 in response to each speed sensor pulse. This pulse couples with the RESET input of binary counter 120 (such as a CMOS CD-4024). A clock oscillator utilizing inverters 122-1, 122-2, 122-3 operate together with quartz crystal 124 (here shown as a typical "TV color burst" crystal) to produce a 3.579545 MHz signal on line 126. This line couples with the CLOCK input of the flipflop 117-1, and therefore the pulse on line 119 has a period of about (1/3.579545 MHz)=0.280 microsecond (280 nanoseconds).

The signal on line 126 also couples with the CLOCK input of a counter 130, which together with AND gate 132 serves to divide the incoming signal frequency to a substantially lower frequency on line 134 that couples with the CLOCK input of the counter 120. In the shown arrangement, division is by '25' resulting in a 3579545/25=143,181.8 Hz signal on the line 134. The counter output is decoded by several AND gates 136-1, 136-2, 136-3. In the shown arrangement, which is depicted in overall dependency upon the sensor rotor having 44 lobes (viz, 44 pulses produced on signal line 114 per revolution of the sensor rotor), the gates 136-1, 136-2, 136-3 act in concert to effectively 'divide by 113' at the output of gate 136-2, and 'divide by 114' at the output of gate 136-3. In effect, gate 136-2 produces the MEDIUM control signal, whilst gate 136-3 produces the HIGH control signal. If the motor is running lightly loaded, its speed ordinarily will be fast enough that the RESET of counter 120 occurs before count '113' or count '114' can be decoded. You will find that the TAC signal on line 117 couples with OR gate 142 with a result that a HIGH level on line 117 resets the latch combination of NOR gates 140-1, 140-2 producing a LOW level at the output of NOR gate 140-2 that couples with the 'D' input of latch 148-1. In a like way, a HIGH level on line 117 also couples with NOR gate 144-2, resetting the latch hookup of NOR gates 144-1, 144-2 producing a LOW level on the 'D' input of latch 150-1. Under this state condition, the outputs of each NOR gate 140-1, 144-1 is HIGH and combines in AND gate 138 to produce a HIGH level at the 'D' input of latch 146-1. The TAC pulses on line 117 also clock the latches 146-1, 148-1, 150-1 with the result that the outputs are respectively HIGH, LOW, LOW. These outputs are coupled with the 'D' inputs of correspondent latches 146-2, 148-2, 150-2 and the state level is clocked-through by a 120 Hz signal on line 172. This signal is derived in FIG. 3A from the secondary of a transformer 160 that is full-wave rectified by diodes 162-1, 162-2 developing a 120 Hz frequency signal at the juncture with steering diode 162-3. This 120 Hz signal couples to the base of NPN transistor 164 where it is substantially amplified, producing a narrow positive spike-like pulse on the collector line 166. Inverter 168-1 further shapes the pulse, delivering a signal on line 170 coupled between the figures on line LFA then feeding through inverter 168-2 to line 172 of FIG. 3B. Under the preceding scenario, the Q output of latch 146-2 is HIGH, resulting in a HIGH level on line TLA that couples with the base of NPN transistor 180-3 in FIG. 3A. The transistor is turned-ON, resulting in coupling between the optocoupler 186-1 portion with the optocoupler 186-2 portion. Thus triac 188-3 is turned-ON, coupling a.c. power with the RLO tap of the motor run winding 104. Under this condition, motor power is reduced together with motor losses.

An increased motor load may slow the motor down sufficiently to a point where counter 120 counts up to '113' prior to reset. Under this condition, the HIGH level at the output of AND gate 136-2 sets the NOR gate latch, producing a HIGH level at the 'D' input of latch 148-1. The output of NOR gate 140-1 is now LOW as coupled with AND gate 138, with the result that the output of the AND gate also is LOW. As before, the TAC pulse on line 117 transfers the 'D' input signal through latch 148-1 while the 120 Hz signal on line 172 acts to transfer through latch 148-2. The result is a HIGH level on line TMA (while the other two lines are LOW) as coupled with the base of NPN transistor 180-2. Optocoupler 184-1, 184-2 acts to turn-ON triac 188-2 thereby coupling a.c. power with RUN winding 104 tap RMD.

A still further increased motor load may slow the motor down even further to a point where counter 120 counts up to at least '114' prior to reset. Under this condition, the HIGH level at the output of AND gate 136-3 sets the NOR gate latch, producing a HIGH level at the 'D' input of latch 150-1. The output of NOR gate 144-1 is now LOW as coupled with AND gate 138, with the result that the output of the AND gate is also LOW. As before, the TAC pulse on line 117 transfers the 'D' input signal through latch 150-1 while the 120 Hz signal on line 172 acts to transfer through latch 150-2. The result is a HIGH level on line THA (while the other two lines are LOW) as coupled with the base of NPN transistor 180-1. Optocoupler 182-1, 182-2 acts to turn-ON triac 188-1 thereby coupling a.c. power with the RUN winding 104 tap RHI.

Computer software may be utilized to find different combinations of loaded and unloaded motor speeds as related to clock frequency and tooth-count of the speed sensor rotor 110. My BASIC language program is particularly handy, quickly giving the division factor for counter 130 and decoder 132 in combination with the division factors for counter 120 and decoders 136-1, 136-2, 136-3. It accepts a wide range of clock frequencies up to 10-MHz and determines error introduced by any particular division factors.

```
10      'DIVIDER FACTOR DETERMINATION                                        TACDIV-1.BAS
20      'Motor Slip Speed Load Determination Method                          Ver. 1.1
30      '(c) H. Weber K1VTW 10/29/90 MBASIC-80 Syntax
40      '- - - - - - - - - - - - - - - - - - - - - - - - - - - - - - - - -
50      GOSUB 850
60      PRINT CLHS
70      PRINT TAB(25);"MOTOR POWER CONTROLLER"
80      PRINT:PRINT TAB(14);">> SLIP-SPEED SENSOR DECODER COMPUTATIONS <<"
90      PRINT:PRINT TAB(21);"(c) H. Weber - K1VTW - Oct. 1990":PRINT:PRINT
100     PRINT "ENTER >        CLOCK FREQUENCY IN HZ: ";:INPUT CKF#
110         IF CKF#>1E+07 THEN 100
120         IF INT(CKF#)=0 THEN CKF#=3579545#
130     PRINT TAB(14);"FULL LOAD MOTOR SPEED: ";:INPUT FLS
140     PRINT TAB(11);"MINIMUM LOAD MOTOR SPEED: ";:INPUT NLS
150         IF NLS<FLS THEN 60
160     PRINT TAB(9);"NUMBER OF TACH WHEEL TEETH: ";:INPUT TETH
170         IF TETH<2 OR TETH>100 THEN 160
180         IF CKF#<TETH*10000! THEN 190 ELSE 230
190     PRINT BBEL$
200     PRINT "CLOCK FREQUENCY IS TOO LOW ... ";
210     PRINT "IT SHOULD BE AT LEAST ";TETH*10000;"Hz"
220     PRINT:PRINT:GOTO 100
230     FLF=(FLS/60)*TETH
240     NLF=(NLS/60)*TETH
250     ALF=((FLS+NLS)/120)*TETH
260     FLX=CKF#/FLF
270     NLX=CKF#/NLF
280     DVA=INT(((FLX-NLX)/2)+.5)
290     CKX#=CKF#/DVA
300     FLDV=INT((CKX#/FLF)+.5)
310     NLDV=INT((CKX#/NLF)+.5)
320     ALDV=INT((CKX#/((NLF+FLF)/2))+.5)
330     FLER=INT((((CKX#/FLF)-FLDV)/(CKX#/FLF))*10000)+.5)/100
340     NLER=INT((((CKX#/NLF)-NLDV)/(CKX#/NLF))*10000)+.5)/100
350     ALER=INT((((CKX#/ALF)-ALDV)/(CKX#/ALF))*10000)+.5)/100
360         FOR A=1 TO 4
370             IF A=1 THEN K$=HEX$(DVA)
380             IF A=2 THEN K$=HEX$(FLDV)
390             IF A=3 THEN K$=HEX$(ALDV)
400             IF A=4 THEN K$=HEX$(NLDV)
410         PRINT ".";
420             IF LEN(K$)<2 THEN K$="0"+K$
430             IF LEN(K$)>2 THEN 440 ELSE 470
440         PRINT:PRINT "DECODER STATES OVER '255' ... ";
450         PRINT "TRY ANOTHER COMBINATION OF VALUES."
460         PRINT BBEL$:FOR T=1 TO 2000:NEXT T:GOTO 60
```

```
470         FOR B=1 TO 2
480           FOR C=0 TO 15
490             IF B=1 AND (HEX$(C)=LEFT$(K$.1)) THEN LB$=MID$(BIN$X, ((C*4)+1),4)
500             IF B=2 AND (HEX$(C)=RIGHT$(K$,1)) THEN RB$=MID$(BIN$X. ((C*4)+1),4)
510           NEXT C
520           IF A=1 THEN DVAB$=LB$+" "+RB$
530           IF A=2 THEN FLDB$=LB$+" "+RB$
540           IF A=3 THEN ALDB$=LB$+" "+RB$
550           IF A=4 THEN NLDB$+LB$+" "+RB$
560         NEXT B
570       NEXT A
580       CKSF#=(INT(CKX#*100))/100
590       PRINT:PRINT TAB(6);"CLOCK SUB-FREQUENCY SHOULD BE: "; CKSF#;"Hz":PRINT
600       PRINT TAB(45);"DECIMAL";
610       PRINT TAB(54);"HEX";
620       PRINT TAB(60);"BINARY";
630       PRINT TAB(72);"ERROR"
640       PRINT
650       PRINT "DIVIDE ";CKF#;"Hz CLOCK FREQUENCY BY: ";
660       PRINT TAB(45);DVA;
670       PRINT TAB(54);HEX$(DVA);
680       PRINT TAB(60);DVAB$
690       PRINT " FULL-LOAD DECODER FACTOR SHOULD BE: ";
700       PRINT TAB(45);FLDV;
710       PRINT TAB(54);HEX$(FLDV);
720       PRINT TAB(60);FLDB$;
730       PRINT TAB(72);FLER;"%"
740       PRINT " MID-SPEED DECODER FACTOR SHOULD BE: ";
750       PRINT TAB(45);ALDV;
760       PRINT TAB(54);HEX$(ALDV);
770       PRINT TAB(60);ALDB$;
780       PRINT TAB(72);ALER;"%"
790       PRINT " NO-LOAD DECODER FACTOR SHOULD BE: ";
800       PRINT TAB(45);NLDV;
810       PRINT TAB(54);HEX$(NLDV);
820       PRINT TAB(60);NLDB$;
830       PRINT TAB(72);NLER;"%"
840       END
850       'ANSI DEC VT-100 Terminal Control Functions
860       Z$=CHR$(27):CL$$=Z$+"[2J":CLH$=CL$$+Z$+"[f":BBEL$=CHR$(7)+CHR$(7)
870       BIN$X="0000000100100011010001010110011110001001101010111100110111101111"
880       RETURN
890       'finis
```

D.c. power for circuit operation is provided by charging capacitor 190-1 with rectified 120 Hz energy obtained through steering diode 162-3. A dropping resistor 192 and zener diode 194 serve to maintain an adequately constant voltage across capacitor 190-2 to provide d.c. power on the EB line that may connect with each of the logic elements and other portions of my circuit's arrangement.

Figure 4:
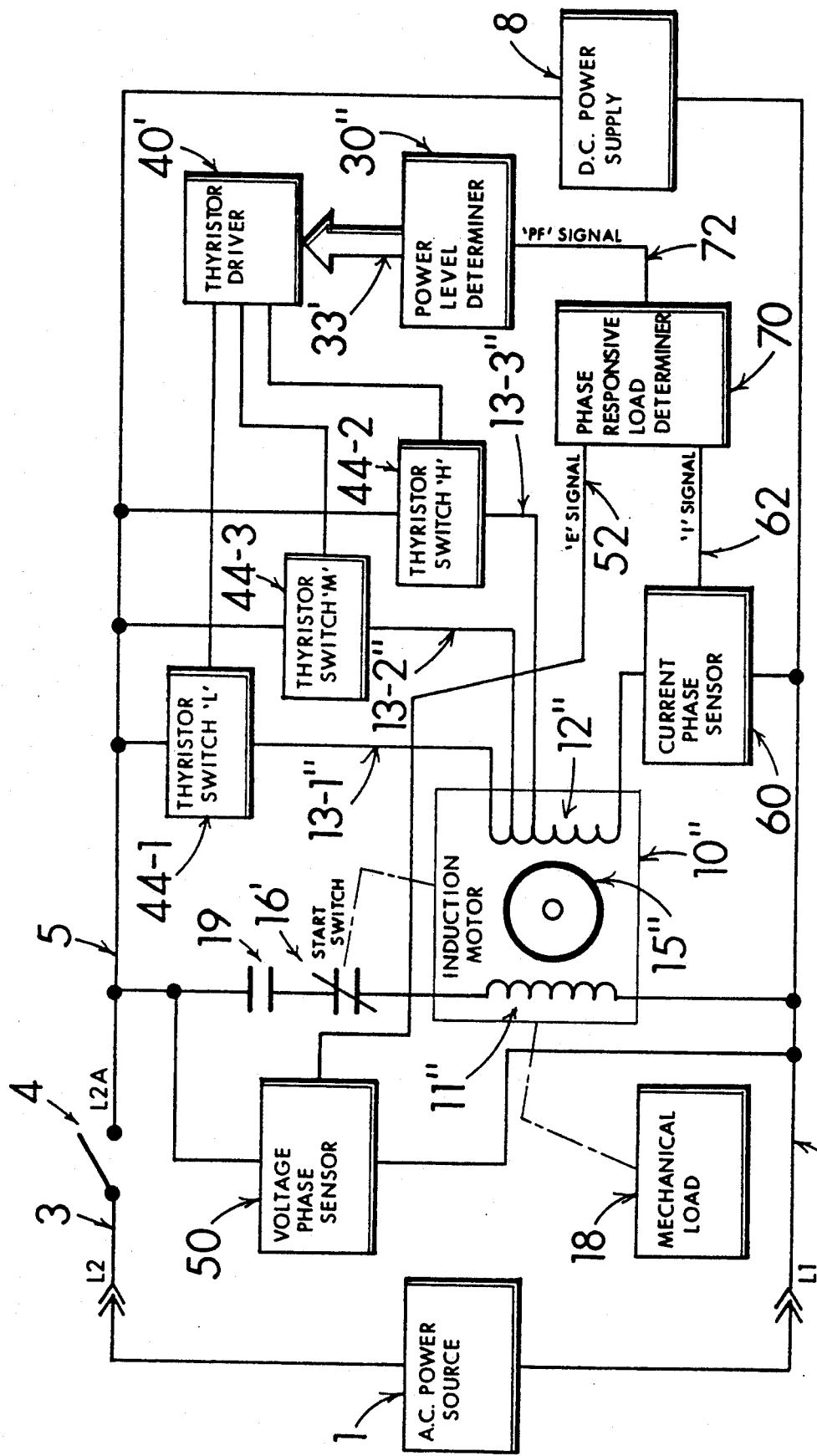
FIG. 4—Block diagram showing motor load sensing using changes in motor current phase lag (e.g., power factor).

An induction motor ordinarily changes its current phase in response to changes in rotor speed. Said another way, power factor changes with motor loading. In FIG. 4 I utilize this characteristic of virtually all a.c. induction motors to determine the extent of mechanical loading imposed upon the motor by the load 18 at any instant. A capacitor-start induction motor 10" having a START winding 11" and RUN winding 12" produces rotation of a rotor 15" that couples with the mechanical load 18. As is well known practice, starting may be controlled by an initially closed (at rest) centrifugal switch 16' that connects a.c. power with the START winding through a starting condensor 19. A VOLTAGE-PHASE SENSOR 50 couples across tha a.c. power line, producing what may be called a zero-reference phase 'E' signal on line 52. Simultaneously, the motor's RUN winding current couples through a CURRENT PHASE SENSOR 60, resulting in a lagging phase 'I' SIGNAL on line 62. A PHASE RESPONSIVE LOAD DETERMINER 70 which is a specialized phase comparator that serves to produce a 'PF' signal on line 72 having a level sense whereby maximum phase difference between the 'E' signal and the 'I' signal denotes minimum motor loading. This 'PF' signal couples with the power level determiner 30" that functions to produce signals on the coupling bus 33' which, through the thyristor driver 40', produces turn-ON of one of the three thyristor switches 44-1, 44-2, or 44-3 at any given moment. The overall operation result is that, as motor loading increases and the phase difference between the 'E' and 'I' signals decreases below a predetermined limit the thyristor 'H' is turned-ON, coupling a.c. power with the RUN winding tap 13-3. Otherwise, with moderate loading, or minimal loading either thyristor switch 'M' or thyristor switch 'L' turns ON, applying power to corresponding RUN winding taps 13-2" or 13-1" resulting in a decrease of energy loss in the motor structure under conditions of less than about full load.

Figure 5A:
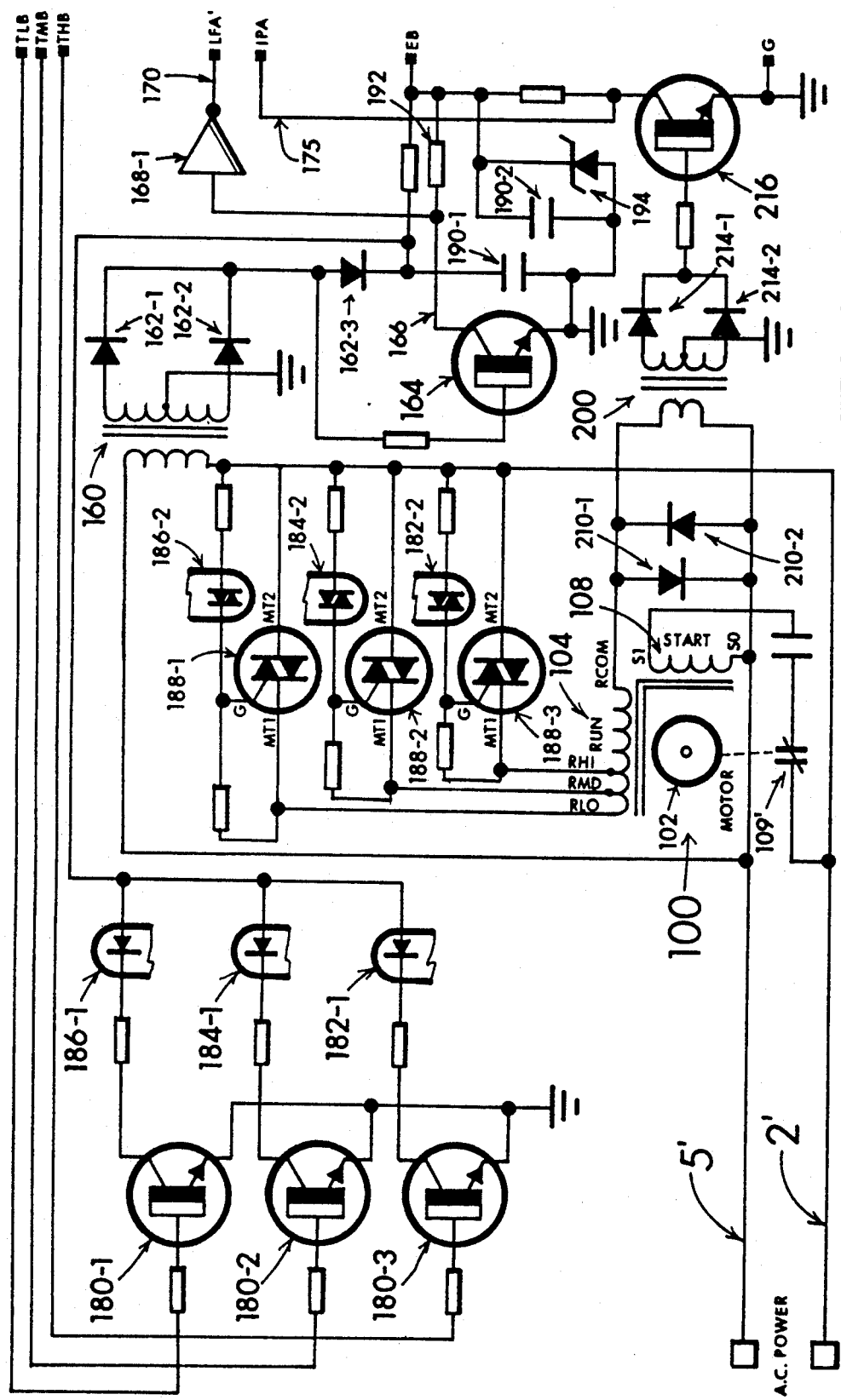
FIG. 5—Two drawing sheets 5A and 5B show electrical diagram for an embodiment of a power factor responsive controller.

The motor 100 now shown in FIG. 5A is driven with a power level controlled by the thyristors 188-1, 188-2, 188-3 and determined by coupling the motor's RUN winding RCOM with the a.c. power line 5' through two back-to-back coupled power diodes 210-1, 210-2 that produce about a 1.4 volt p-p signal that couples with a primary winding of transformer 200. Ordinarily this transformer may have about an 1:8 step-up, producing about 11.2 volts p-p across the secondary winding. Diodes 214-1, 214-2 (say 1N4148) rectify this signal, delivering about 4.9 volts peak to the base of transistor 216. I particularly describe the novel operation of this part of my invention in copending application Ser. No.

07/565,351 for "Wide-Range A.C. Power Curent-Phase-Angle Detector Method and Apparatus" filed Aug. 10, 1990. A current phase pulse signal is developed on line 175, coupling with FIG. 5B through connection IPA.

A clock oscillator in FIG. 5B includes CMOS inverters 220-1, 220-2, 220-3 (e.g., CD4069 for example) that together with a 32,768 Hz crystal 222 (of the type ordinarily used in "quartz" wristwatches, etc.) develops a clock signal that couples with the CLOCK input of counter 230. Remembering from FIG. 3A and now as shown in FIG. 5A, the signal LFA on line 170 is essentially derived from the line voltage phase and therefore may be used as a "reference" or voltage phase signal. This signal couples through an inverter 168-2 developing a signal on line 169 that couples with the RESET input of counter 230, NOR gates 234-2, 236-2 and the CLOCK inputs of latches 240-2, 242-2, 244-2. The counter 230 "counts-up" and the resulting states may be decoded by either AND gate 232-1 or 232-2. As depicted, gate 232-1 decodes a count of '92' (0101 1100), while gate 232-2 decodes a count of '85' (0101 0101). What occurs is that the decoded count from the output of AND gate 232-1 SETS a flip-flop latch made up of NOR gates 234-1, 234-2; while AND gate 232-2 SETS the other latch comprising NOR gates 236-1, 236-2. Timing is the key to function in this circuit arrangement. Since the counter 230 is reset to zero by the reference signal, it will only count up so far before the 'I' signal (lagging current phase signal) appears on line 178 transferring the 'D' input state of latches 240-1, 240-2, 240-3 to the respective 'Q' outputs. In other words, when the 'I' signal pulse occurs and counter 230 has counted up to less than '85', AND gate 238 produces a HIGH state from its output as fed to the 'D' input of latch 244-1 (while of course the 'D' inputs of latches 240-1, 242-1 are yet LOW) that transfers through the latch and produces a HIGH level on the 'D' input of latch 244-2. The next reference signal pulse then transfers this HIGH level through the latch 244-2, producing a HIGH level on line THA'. This is a condition which may occur when the current lag is small, such as when the motor is running near or with full load. As the motor load lessens, the 'I' signal phase lags more (produced by the motor's increased inductive reactance that introduces more current phase lag) with the result that counter 230 might count up higher, say to something between '85' (0101 0101) and '91' (0101 1011) prior to 'I' signal occurance on line 178. Under this condition, the HIGH level produced from the AND gate 232-2 will SET the latch (NOR gates 236-1, 236-2), producing a LOW on the output of gate 236-1 that couples with AND gate 238, driving the output of the AND gate LOW. Meanwhile, the output of NOR gate 236-2 assumes a HIGH state as coupled with the latch 242-1 'D' input. On the very next current phase 'I' signal pulse, this HIGH state transfers to the Q output of latch 242-1 awaiting the clocking of latch 242-2 to produce a HIGH level on its Q output and line TMA' subsequent to the next reference signal pulse.

If phase lag is even greater, such as with an unloaded motor, then a count of '92' from counter 230 may be exceeded. This SETS the latch (consisting of NOR gates 234-1, 234-2) to produce a HIGH state on the 'D' input of latch 240-1 that may be transferred through to the 'D' input of latch 240-2 and ultimately to line TLA'. Reverting to FIG. 5A, you will find that a HIGH level on line TLA' turns transistor 180-1 "ON" together with resulting turn-ON of triac 188-1 that couples a.c. power between the RCOM and RLO connections of the motor's RUN winding. If line TMA' is HIGH, transistor 180-2 turns-ON together with triac 188-2 thereby coupling a.c. power between the RCOM and RMD connections of the motor's RUN winding. On the other hand, if line THA' is HIGH, transistor 180-3 turns ON together with triac 188-3 that together couple a.c. power between the RCOM and RHI connections of the motor's RUN winding.

A BASIC computer program may be utilized to define the counter 230 decode states (as determined by logic associated with the counter output lines such as herewithin depicted by gates 232-1, 232-2 and 232-3). This handy program is provided to assist in implementing other power factor ranges for my invention.

```
10      'PROGRAM TO FIND DIVIDER AND PHASE LAG RELATIONSHIP              LAGDIV-2.BAS
20      '(c) H. Weber 5/21/90 K1VTW - MBASIC-80 Syntax                    Ver. 1.02
30      '- - - - - - - - - - - - - - - - - - - - - - - - - - - - - -
40      GOSUB 530
50      PRINT CLH$
60      PRINT TAB(24);"MOTOR POWER CONTROLLER":PRINT
70      PRINT TAB(14);"PHASE LAG LOGIC - - COUNTER DECODER VALUES":PRINT
80      PRINT TAB(18);"(c) H. Weber - K1VTW - May 1990":PRINT:PRINT:PRINT
90      INPUT ">> ENTER <<      Clock Frequency (Hertz): ";CKF$
100     FOR L=1 TO LEN(CKF$)
110     IF MID$(CKF$,L,1)<"0" OR MID$(CKF$,L,1)>"9" THEN 90
120     NEXT L
130     CK=VAL(CKF$)
140         IF CK<20000 OR CK>1E+07 THEN 90
150     MXH=CK/480
160     IF CK>43200! THEN MXL=CK/43200! ELSE MXL=1
170     MXD=(MXH-MXL)/(90-1)
180     GOSUB 460
190     PRINT SRON$+CPF$
200     DA=1:PL=0:N=2
210     DA=DA+MXD
220     DX=INT(DA+.5)
230         IF DX=DB THEN 210
240         LAG=INT((360/((CK/DX)/60))*10)/10
250         PF =INT((COS(LAG/57.3)*100)*10)/10
260         IF LAG>90 THEN 420
270         HX$=HEX$(DX)
280     BIN$=""
290     FOR J=1 TO LEN(HX$)
300         FOR K=0 TO 15
```

```
310         READ BX$
320             IF HEX$(K)=MID$(HX$,J,1) THEN 340
330             NEXT K
340         RESTORE
350         BIN$=BIN$+BX$+" "
360     NEXT J
370             IF LEN(HX$)>2 THEN HX$=LEFT$(HX$,2)+" "+RIGHT$(HX$,2)
380     PRINT TAB(16);LAG;:PRINT TAB(28);PF;
390     PRINT TAB(42);DX;:PRINT TAB(54);BIN$
400         DB=DX:PL=PL+1
410         GOTO 210
420     PRINT SROF$
430     END
440     DATA "0000","0001","0010","0011","0100","0101","0110","0111"
450     DATA "1000","1001","1010","1011","1100","1101","1110","1111"
460     PRINT CLH$:PRINT TAB(15);"CLOCK FREQUENCY: ";CK;"Hertz":PRINT
470     PRINT TAB(15);"I PHASE";:PRINT TAB(28);"POWER";
480     PRINT TAB(41);"DIVISION";:PRINT TAB(54);"DECODE"
490     PRINT TAB(15);"LAG DEG.";:PRINT TAB(28);"FACTOR";
500     PRINT TAB(41);"FACTOR";:PRINT TAB(54);"STATES"
510     PRINT TAB(15);"";:FOR A=1 TO 48:PRINT "—";:NEXT A:RETURN
520     'ANSI control functions for DEC VT-100 terminal
530     Z$=CHR$(27):CLS$=Z$+"[2J":CLH$=CLS$+Z$+"[f":CPF$=Z$+"[6f"
540     SRON$=Z$+"[7;24r":SROF$=Z$+"[1;24r":RETURN
550     'finis
```

Figure 6:
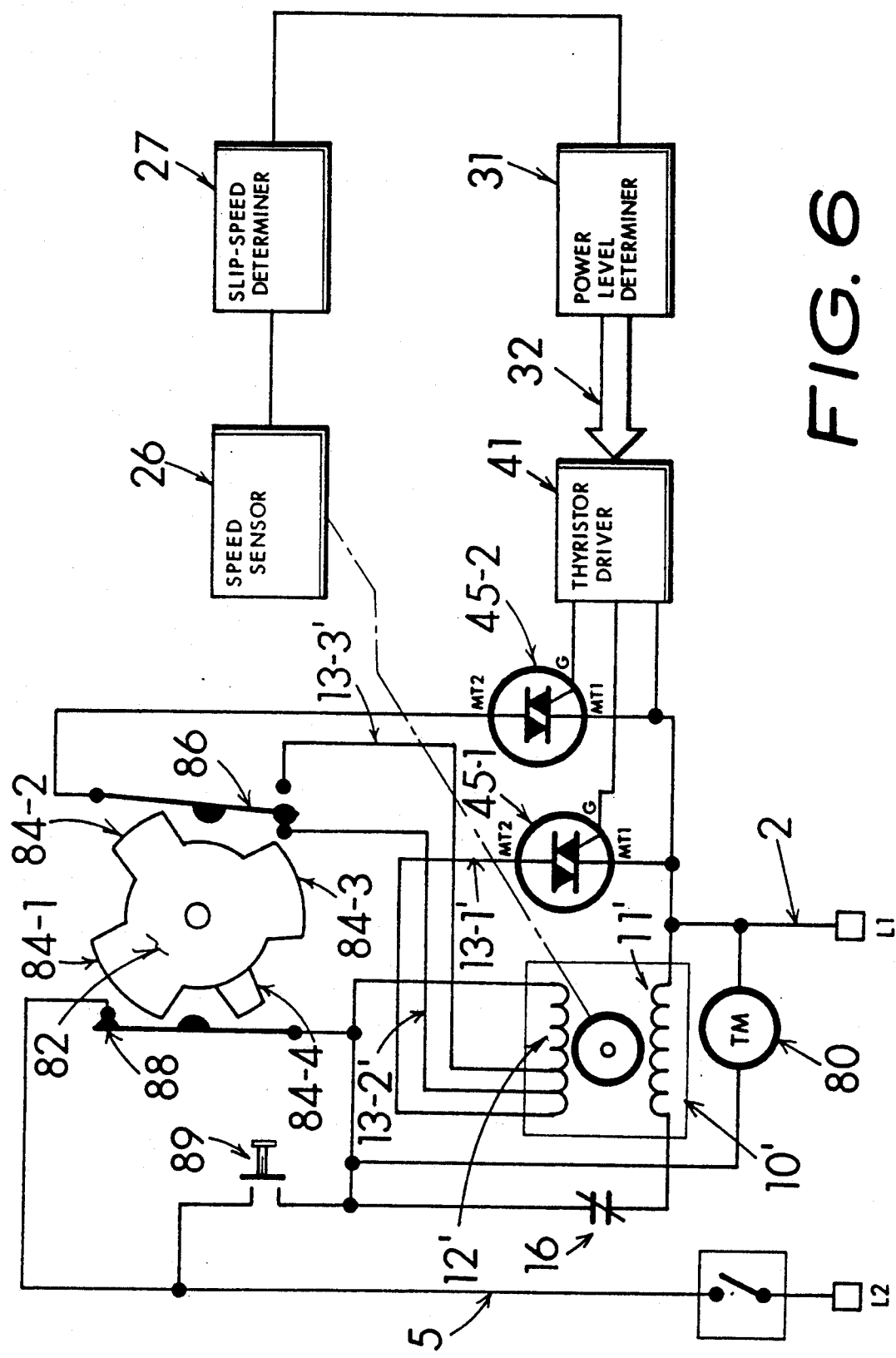
FIG. 6—Motor controller utilizing cam driven timer to define load pattern sequence and change motor winding taps.

A sequence of predetermined load levels likely to be encountered by the motor 10' is utilized in FIG. 6 to optimize motor excitation. A timing motor 80 couples with a set of cams 82 to control a pair of switch contacts 86,88 to institute sequential RUN winding modulation in accord with some pattern determined primarily by cam lobes 84-1, 84-2, 84-3 which serve to actuate the SPDT switch contact set 86 and thereby correspond with the likely load levels. In effect this switch selects between the motor's RUN winding medium and high power taps 13-2' and 13-3' in this depicted arrangement. A speed sensor 26, together with a SLIP SPEED DETERMINER 27 produces a slip-speed error signal that couples with a POWER LEVEL DETERMINER 31 to produce the thyristor control signals on signal bus 32. Under conditions of minimum motor loading, thyristor 45-1 is turned-ON and the RUN winding tap 13-1' is energized. Conversely, when motor loading increases, thyristor 45-2 is turned-ON and either the RUN winding tap 13-2' or 13-3' is energized. In a washing machine, for example, switch 86 may couple the thyristor 45-2 with the tap 13-2 when less than full load is anticipated: for example, during 'agitate' mode. Alternatively, when full loading is likely as during a 'spin cycle' mode clockwise rotation of the cam lobes may push the switch contacts 'outward' thereby coupling the thyristor 45-2 with the high power tap 13-3'. The other contact set 88 interacts with the cam lobe 84-4 to effect ON/OFF control of the overall apparatus. In other words, when the cam lobe 84-4 pushes the switch contact 88 'outward' the contact OPENS and a.c. power application to the circuit ceases. Pressing button switch 89 momentarily applies power causing the timer motor 80 to advance the cam rotation clockwise to an extent where cam lobe 84-4 permits the switch 88 to close and operation continues throughout the cam rotational cycle, until cam lobe 84-4 again opens the switch.

Figure 7:
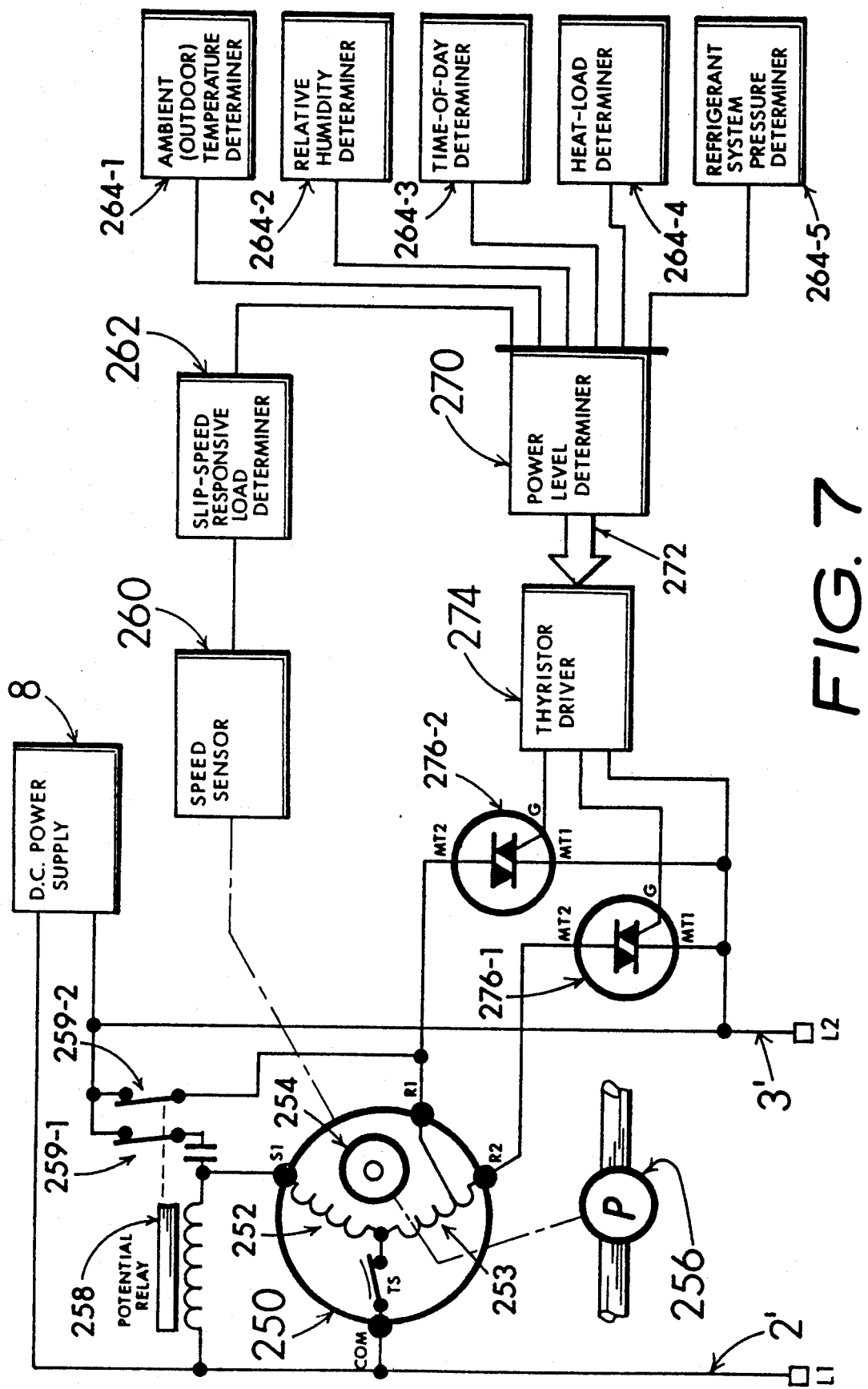
FIG. 7—Motor driven refrigerant compressor arrangement finds power control changes as determined from combinations of any of instant loading (as determined from slip speed changes), ambient temperature, relative humidity, time of day, heat load, and refrigerant system pressure changes.

A hermetic refrigeration compressor (of the type commonly used in refrigerators and air conditioners) 250 is shown in FIG. 7 to include a START winding 252 and a tapped RUN winding 253. The rotor 254 couples with and drives the compressor's pump 256 that together with the motor structure is ordinarily contained within a common enclosure together with oil and refrigerant such as R-12 (dichlorodifluoromethane) or R-22 (monochlorodifluoromethane). A potential relay 258, together with a normally closed contact set 259-1 couples a.c. power through a starting capacitor with the START winding 252 (terminal S1) of the motor. As the motor gains speed, voltage proportionately higher voltage develops across the START winding and the relay coil. Upon reaching 80% –90% of rated speed, the relay coil is sized such that the developed voltage will be sufficient to open the contact set and remove further a.c. power connection with the START winding. The artisan may refer to *Modern Refrigeration and Air Conditioning*, Andrew D. Althouse et al, The Goodheart-Willcox Co., Inc., So. Holland, IL (ISBN 0-87006-340-5) where pages 218–219 and pages 261–262 give considerable description and examples of this kind of starting scheme. A second normally closed contact set 259-2 also couples a.c. power line 3' directly with the RUN winding 254 tap location terminal R1. Thus the fullest level of magnetic excitation and resulting motor torque is produced during start-up.

A SPEED SENSOR 260 detects the effective speed of the rotor 254, producing a speed signal that couples with a SLIP-SPEED RESPONSIVE LOAD DETERMINER 262. Several other conditional signals are also brought forth in this arrangement. An AMBIENT TEMPERATURE DETERMINER 264-1 produces a signal that reflects outdoor temperature (or possibly "room temperature") while a RELATIVE HUMIDITY DETERMINER 264-2 produces a humidity related signal. In an air conditioning system in particular, the load presented to the system varies with time-of-day. Thus a TIME-OF-DAY DETERMINER 264-3 produces an appropriate control signal. A HEAT-LOAD DETERMINER 264-5 may also develop a useful signal for air conditioning, where the heat load may for example represent the a.c. power flow fed to overhead lighting or other significant sources of heat potential in an air conditioned area. In an air conditioner application, a REFRIGERANT SYSTEM PRESSURE DETERMINER 264-6 may set operating conditions for the overall system. System pressure promptly reflects changes in a variety of conditions such as for example, the ambient temperature and relative humidity to which each the condensor and evaporator coils are exposed. Any of these several factors may be individually or jointly brought together as inputs to a POWER LEVEL DETERMINER 270 that is logically designed to develop a signal on line 272 representing instant levels of motor power needed to maintain efficient motor operation. This developed signal couples through the THYRISTOR DRIVER 274 to produce turn-ON of one or the other of the respective LOW and HIGH level thyristors 276-1, 276-2 that act to feed power to the rUN winding 253.

Figure 8:
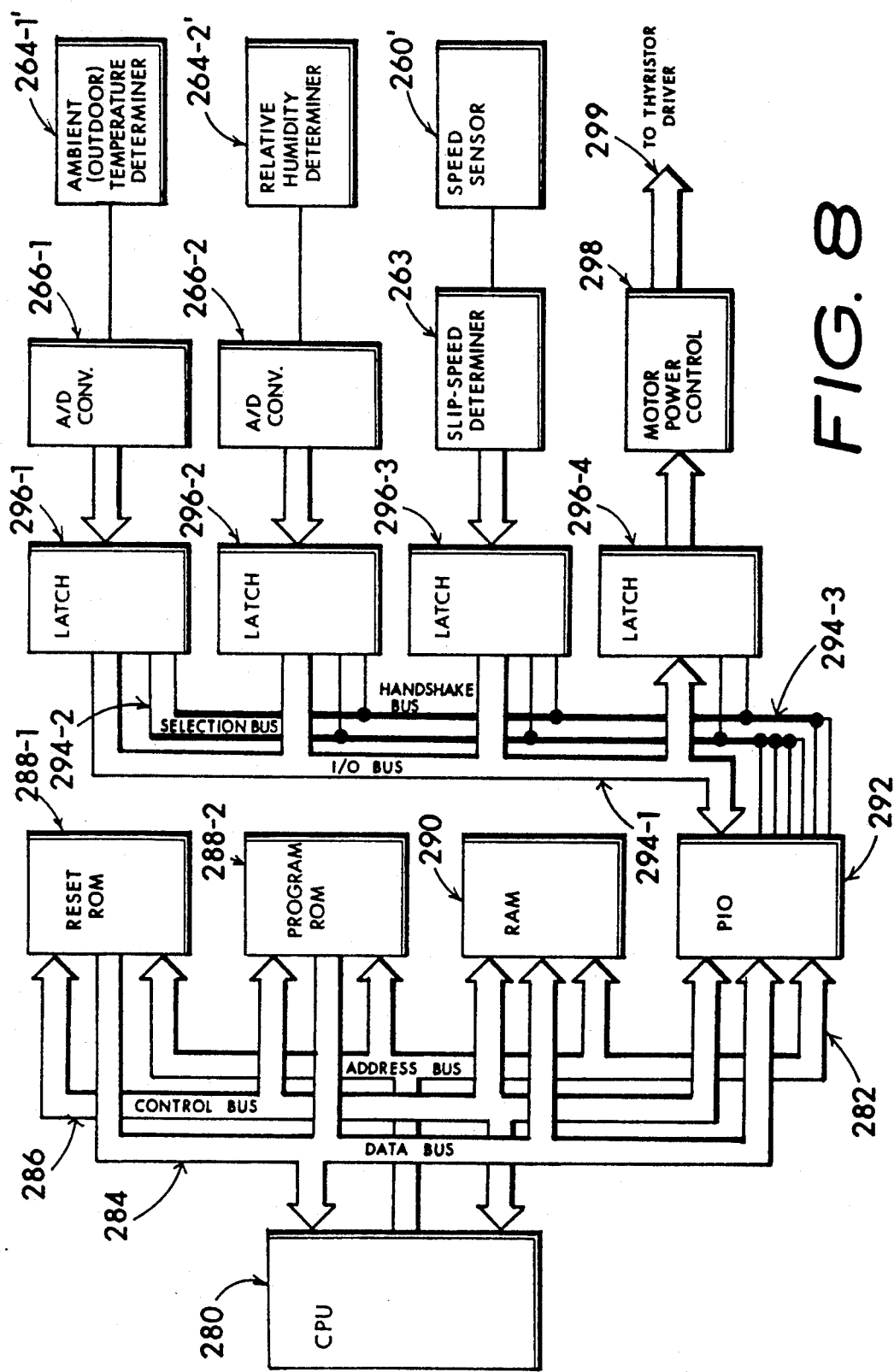
FIG. 8—Microcomputer determination of motor power level.

The power level determiner 270 of FIG. 7 may take many forms as developed by an artisan having suitable skills in the field. I depict one such embodiment in FIG. 8 that uses a CPU 280 (e.g., a microprocessor such as a Zilog Z-80, RCA 1802, or the like). As is well known, a microprocessor ordinarily utilizes three signal bus lines. An ADDRESS BUS 282 developed by the microprocessor selects locations in the several memory devices 288-1, 288-2, 290 and input/output lines of the PIO 292. Data between the devices is of course conveyed over the DATA BUS 284. A CONTROL BUS 286 provides interconnection of the many enablement, strobe and other such control signals. Several condition determiners 264-1', 264-2' produce signals that couple with A/D converters 266-1, 266-2 to convert the usual analog determiner signal format (e.g., temperature, etc.) to a binary format which is held in latches 296-1, 296-2 until the data are transferred to the I/O BUS 294 through appropriate signal commands on the SELECTION BUS 294-2 and HANDSHAKE BUS 294-3. In a like way, the SPEED SENSOR 260' produces a signal that feeds through the SLIP SPEED DETERMINER 263 to produce a digital signal which couples through latch 296-3. A motor control signal is developed by the interaction of the microprocessor with the various bytes of data, together with a processing routine established by the ROM memory devices to develop a signal that couples through output latch 296-4 with a MOTOR POWER CONTROL element 298 to produce a multi-level signal on line 299 that may, for example, couple with the thyristor driver 274 of FIG. 7.

Figure 9:
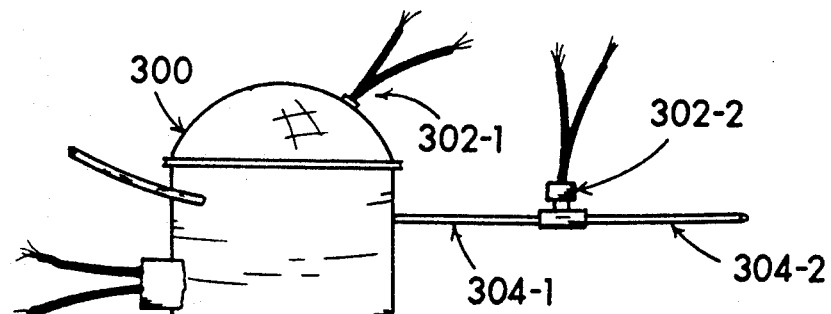
FIG. 9—Motor speed determined by sensing compressor impulse frequency.

A representation of a hermetic refrigeration compressor 300 appears in FIG. 9. A vibration transducer 302-1 affixed to the compressor shell may detect compressor impulses as a frequency signal indicative of motor (e.g., compressor) speed. Alternatively, a pressure transducer 302-2 may be coupled into the compressor's pressure line 304-1, 304-2 to sample compression impulse variations which again reflect compressor speed.

Figure 10:
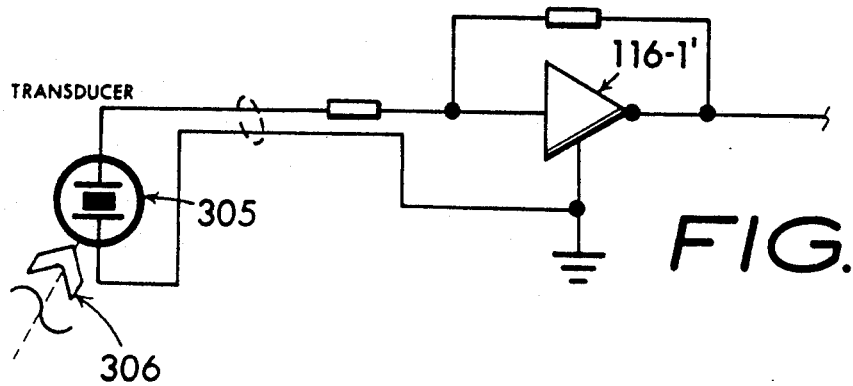
FIG. 10—Preamplifier for impulse frequency sensor.

In FIG. 10, I depict the pressure or vibration transducer 302-3 as being acted upon by pressure or vibration forces 303 toupled with an amplifier 116-1' like that of the embodiment of FIG. 3A.

Figure 11:
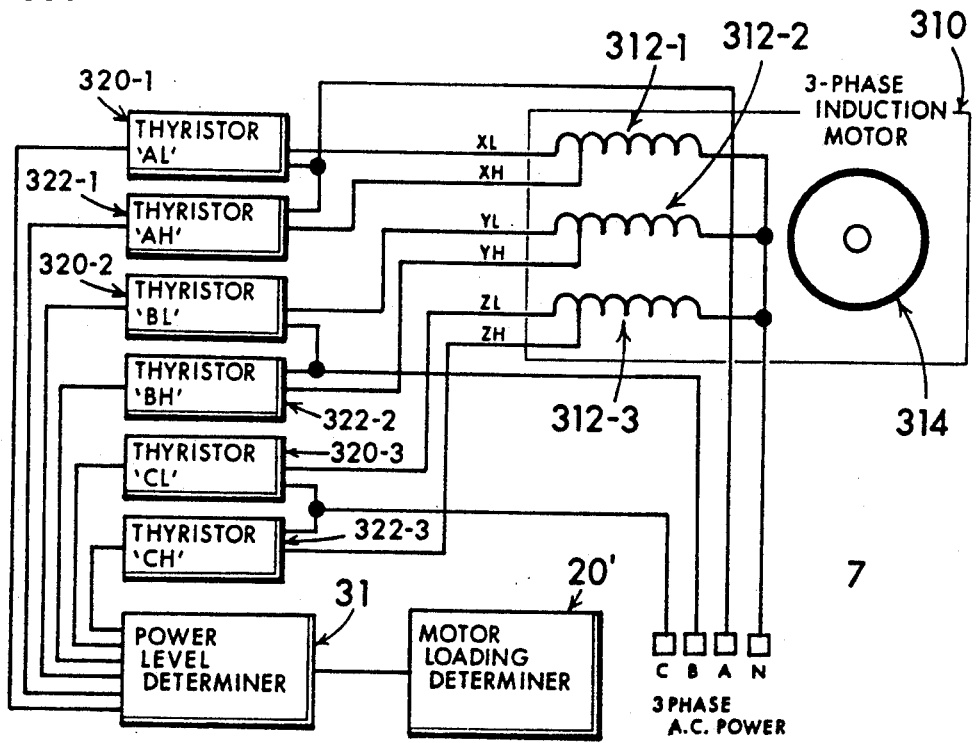
FIG. 11—Three phase operation of a typical motor controller.

Although I have mostly depicted my invention in relation to single phase induction motors, it is obvious that application to two phase or three phase induction motors is equally as advantageous. In FIG. 11 a 3-phase induction motor 310 includes three tapped RUN windings 312-1, 312-2, 312-3 and a rotor 314. A MOTOR LOADING DETERMINER 20' develops a load-representative signal through speed sensing (or power factor determination) that couples with a POWER LEVEL DETERMINER 31 having a multitude of outputs which provide signals to the thyristors 320-1, 320-2, 320-3 and 322-1, 322-2, 322-3 to control power application between the 3-phase power input lines 7 and the LOW power RUN winding tap lines XL, YL, ZL and the HIGH power RUN winding tap lines XH, YH, ZH in proportion to changes in determined levels of motor loading.

Figure 12:
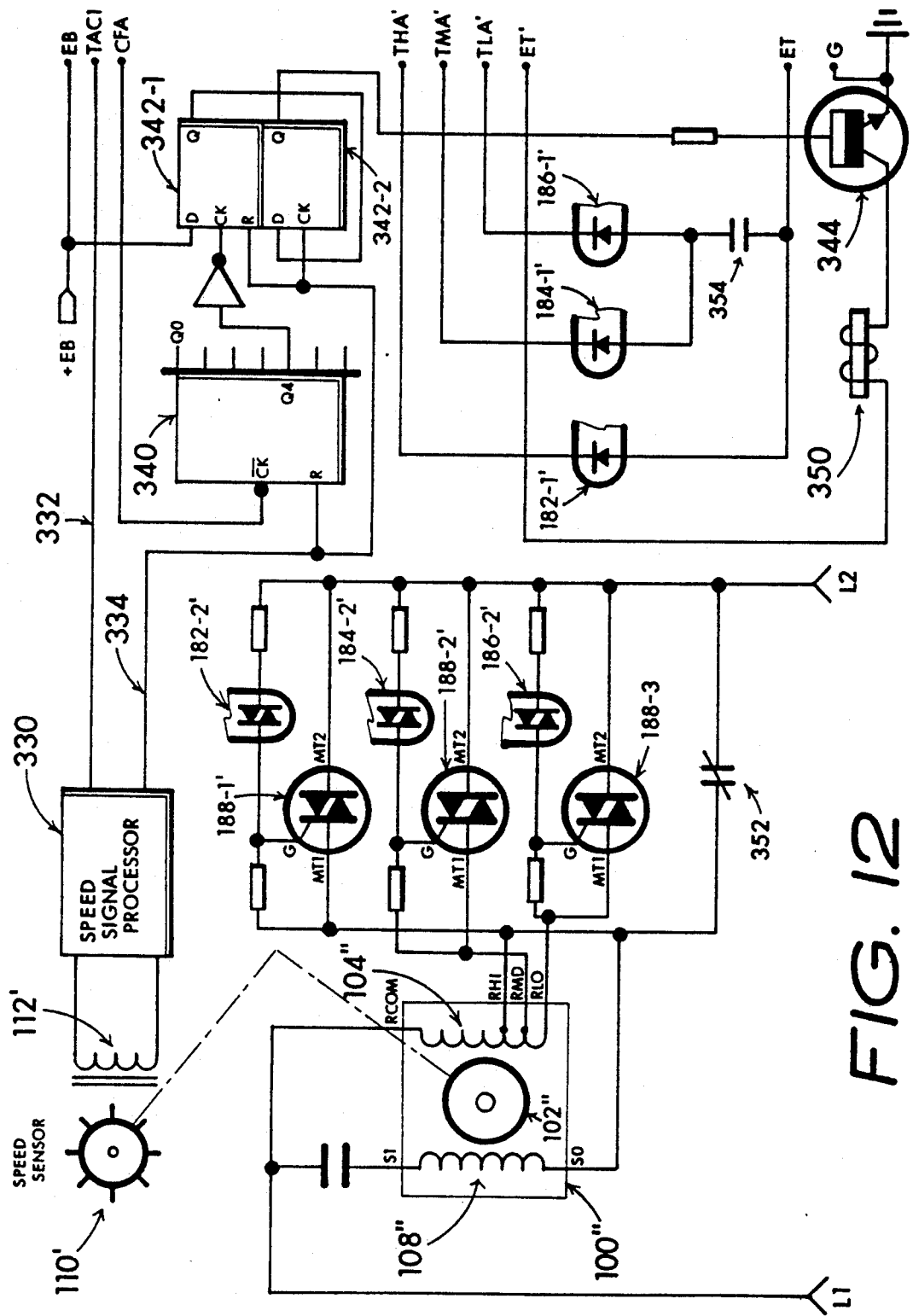
FIG. 12—Relay contact bypasses control circuit when motor speed is below a determined rate; motor START winding obtains power from RUN winding tap which reduces START winding power level through transformer action when less than full torque is produced.

A tapped RUN winding 104" on a PSC (permanent split capacitor) motor 100" appears in FIG. 12 which differs in hookup from the motor 10 of earlier FIG. 1 in that the START winding 108" is connected to the innermost RUN winding tap RHI even when the motor is running with power applied to one of the other taps RMD or RLO by the associated thyristors 188-1', 188-2' or 188-3'. A Dayton Electric Co. (Chicago, IL) motor type 3M898 or General Electric Co. motor type 3996 (each rated ⅓ horsepower at 1,625 r.p.m.) typifies such motors. In this neat arrangement, motor starting and running current is bypassed around the HIGH power thyristor 188-1' whenever the motor speed drops below a threshold level. In this example, the threshold speed is initially selected to be about 1,400 r.p.m. (e.g., about 86% of the rated motor speed) which results in a 1,026 Hz frequency in the speed sensor pickup 112' as induced by a 44-tooth rotor 110'.

$$(1400 \text{ rpm}/60) \times 44 = 1026.67 \text{ Hz}$$

$$(32768 \text{ Hz}/1026.67 \text{ Hz}) = 31.92$$

rounding off to "32" and refiguring, threshold speed becomes:

$$(32768 \text{ Hz}/32) = 1024 \text{ Hz}$$

$$(1024 \text{ Hz}/44) \times 60 = 1,396.37 \text{ rpm threshold speed.}$$

Instant speed frequency, as induced in the pickup is "amplified" and shaped in the SPEED SIGNAL PROCESSOR 330. A speed signal results on line 332 and appears at the TAC1 output connection which might subsequently feed with the slip speed determiner 27 as shown in FIG. 6. A short-duration speed signal pulse developed on line 334 also couples with the RESET input of counter 340, the RESET input of latch 342-1, and the CLOCK input of latch 342-2. (The counter may be a RCA CD-4024, while the latches may be a RCA CD-4013.) A 32,768 Hz clock frequency is also coupled into line CFA (as developed in the oscillator circuit like that of FIG. 5-B from inverter 220-3). When the motor is running below about 1,396.37 r.p.m., reset of the counter is sufficiently infrequent to permit the 32,768 Hz clock frequency to advance the counter output states to a level where a HIGH to LOW transistion occurs on the counter Q4 output (5-th bit line) which means the counter has reached at least "32". This transistion is inverted, producing a LOW to HIGH transistion on the CLOCK input of the latch 342-1 which transfers the HIGH 'D' input level to the 'Q' output with a complementary LOW state on the '/Q' output. Immediately upon occurance of the next speed signal pulse, this LOW '/Q' output state (as coupled with the 'D' input of latch 342-2) transfers through the latch 342-2 to its 'Q' output and thence to the base of a NPN transistor 344. Under this condition, relay coil 350 is de-energized resulting in contact set 352 being 'closed' while contact set '354' is open. As a result, the closed contact set 352 shunts power flow around the thyristor 188-1" saving it from start-up surges or stall currents. Also the now open contact set 354 decouples drc. power from the optocoupler LED devices 184-1' and 186-1' thereby preventing turn-ON of triacs 188-2' or 188-3' by optocoupler devices 184-2" or 186-2". As the motor speeds-up and exceeds about 1,396.37 r.p.m. the counter 340 can no longer count up sufficiently between reset pulses to produce a change of state at the latch 142-1/Q output, which is HIGH. Under this condition, the HIGH output transfers through the latch 342-2 and turns the transistor 344 ON, energizing the relay coil thereby opening contact set 352 and closing contact set 354. Under this condition, RUN winding power is provided through one of the three triacs, while optocoupler LED device portions 184-1' and 186-1' are enabled by the now closed contact set 354. In other words, when the motor is running less than about 1,396.37 r.p.m. the a.c. power is coupled directly with the HIGH level RUN winding connections as provided through contact set 352. Conversely, when the motor is running in excess of about 1,396.37 r.p.m. automatic control of the power tap selections may be accomplished in any of a number of ways at least equivalent to the teachings of FIGS. 1, 2, 6 and 7.

I have endeavored to teach my invention in a particular form which can be conviently described and illustrated, although such choice is merely for purpose of illustration and shall not construe any limitation whatsoever on my invention when it is practiced in any other alternative form which may bring forth substantially the same performance results. I have chosen certain descrete electronic devices to perform the necessitous operational tasks and such choices have enabled me to provided concise description of my invention's novel performance in view of prior art. A skilled artisan may of course be expected to choose other combinations of contemporary elements to obtain essentially the same objectives without departing from the central essence of my invention's novelty including the ability to provide reduced power consumption, lessend harmonic distortion of the power line frequency under conditions of reduced power operation, and efficient utilization of the motor windings as a means for obtaining power level modulation that maintains the motor's running speed about constant while instant torque demand changes. Clearly, many engineering expedients may be incorporated in my invention's embodiment to attain my inventions underlying teaching but these disparate forms which merely incorporate artskill in their application shall not depreciate my invention in view of all the novelty which resides in the appended claims.

What I claim is:

1. Induction motor field excitation method comprising steps of:
    winding a motor RUN field comprising a major winding portion and at least one minor winding portion;
    determining a motor loading signal;
    energizing the major winding portion when level of the determined motor loading signal is about that of a fully loaded said motor; and,
    energizing a seriate connection of the major winding portion and at least one said minor winding portion when the level of the determined motor loading signal is about a predetermined level less than that of a fully loaded said motor.

2. Method of claim 1 whereby the determination of the motor loading signal comprises:
    determining motor slip speed; and,
    producing an effective decrease in the determined level of the motor loading signal in response to a decrease of the determined motor slip speed.

3. Method of claim 1 whereby said motor loading signal is determined comprising steps of:
    sensing the motor's operating power factor; and,
    producing an effective decrease in the determined level of the motor loading signal in response to a decrease of the motor's sensed operating power factor.

4. Method of claim 3 whereby operating power factor is determined comprising steps of:
    determining a reference phase value derived from the a.c. power voltage phase;
    predetermining a nominal value of current phase lag preferably with the motor operating about fully loaded;
    sensing instant current phase lag of the motor; and,
    determining a difference between the reference phase value and value of the sensed instant current phase lag as the operating power factor.

5. Induction motor field excitation method comprising the steps of:
    producing the field excitation with RUN windings comprising seriately wound major and minor portions;
    producing output member rotational torque in response to instant level of the field excitation;
    coupling the output member with a mechanical load;
    determining changes in torque demand level of the mechanical load;
    seriatim coupling of a.c. power with the major and minor portions of the RUN winding effective to produce a moderate said level of field excitation when the determined said torque demand level is less than a predetermined value; and,
    coupling the a.c. power preferably with the major portion of the RUN winding effective to produce an increased said level of field excitation when the determined said torque demand level is at least the predetermined value.

6. Method of claim 5 comprising the steps of:
    providing the field with at least one pair of magnetically opposing pole phase;
    winding each said opposing pole with a substantially separate set of opposingly phased said RUN winding portions; and,
    coupling correspondent said major and minor portions of each said set of RUN winding portions effectively in parallel.

7. Method of claim 5 whereby sensing of changes in the motor torque demand level comprises the steps of:
    sensing a level of instant motor speed;
    determining an increase of the sensed level of instant motor speed as a decrease of the torque demand level;
    determining a decrease of the sensed level of instant motor speed as an increase of the torque demand level.

8. Method of claim 5 whereby the determination of the motor torque demand level comprises the steps of:
    sensing power factor of the coupled a.c. power;
    determining an decrease of the power factor as a decrease of the torque demand level;
    determining a increase of the power factor as an increase of the torque demand level.

9. Method of claim 7 comprising driving of a refrigerant compressor to produce the mechanical load and sensing at least one condition of ambient temperature; relative humidity; compressor operating pressure; and time-of-day to produce a conditional signal that may be combined with the sensed level of instant motor speed to effectively determine the increase or the decrease in the torque demand level.

10. Method of claim 8 comprising driving of a refrigerant compressor to produce the mechanical load and sensing at least one condition of ambient temperature; relative humidity; compressor operating pressure; and time-of-day to produce a conditional signal that may be combined with the determined level of instant motor power factor to effectively determine the increase or the decrease in the torque demand level.

11. Induction motor means comprising:
means for producing magnetic flux field excitation including RUN winding means comprising a seriately coupled plurality of RUN winding portions;
means for producing a level of rotational torque at an output member in proportion to the field excitation;
means for producing fluctuant mechanical loading of the output member;
means for producing a load level signal value proportional to changes in level of the rotational torque coupled between the output member and the mechanical loading means;
means for coupling a source of a.c. power with the plurality of RUN winding portions when the load level signal value is less than a predetermined value; and,
means for coupling the source of a.c. power with a predetermined fewer number of the RUN winding portions when the load level signal value is at least the predetermined value.

12. The RUN winding means of claim 11 comprising:
first winding portion means comprising an ampere/-turn combination that, when coupled with the a.c. power source, produces sufficient magnetic field strength to operate the motor means under a substantially full level of said mechanical loading; and,
second winding portion means comprising substantially fewer turns than the first winding portion means and, when seriately coupled with the first winding portion means and the a.c. power source, produces an overall reduced ampere/turn combination and decreased level of magnetic field strength sufficient to operate the motor means under a reduced level of said mechanical loading.

13. Induction motor means of claim 11 comprising:
means for sensing rotational speed of the output member;
means for determing changes in the sensed rotational speed relative with a nominal value; and,
means for determining the value of the load level signal from the determined changes in the rotational speed.

14. The load level signal determining means of claim 11 comprising:
means for sensing rotational speed of the output member;
means for producing a usually about synchronous level of reference speed signal;
means for determining slip speed as a difference between the reference speed signal and the sensed rotational speed; and,
means for determining the value of the load level signal from changes in the determined slip speed.

15. Induction motor means of claim 11 comprising:
means for sensing changes in motor power factor; and,
means for determining the value of the load level signal from the sensed changes in the power factor.

16. Induction motor means comprising:
stator means;
RUN winding means comprising at least a seriately coupled first portion and second portion effective for producing magnetic field flux excitation in the stator means;
rotor means coupled with the magnetic field excitation and effective to produce rotational torque in an output member;
load means coupled with the output member;
means for determining a motor load level signal value;
means for seriately coupling the first portion and second portion of the RUN winding means with a source of a.c. power when the determined value of the motor load level signal is less than a predetermined value;
means for seriately coupling the source of a.c. power ordinarily with only the first portion RUN winding means when the determined level of the motor loading is at least the predetermined value.

17. Induction motor means of claim 16 comprising:
means for effecting direct coupling of the a.c. power source with a first portion of the RUN winding means when motor speed is sensed to be less than a predetermined value.

18. Induction motor means of claim 16 comprising:
means for determining rotational speed of the output member;
means for determining slip speed as an effective difference between the determined rotational speed and a reference speed;
means for deriving the value of motor loading signal from changes in the determined slip speed.

19. Induction motor means of claim 16 comprising:
means for determining electrical power factor;
means for deriving the value of motor loading signal from changes in level of the determined electrical power factor.

20. Induction motor means of claim 16 comprising:
means for combining the motor means with a compressor means in a hermetic enclosure;
means for sensing pulsations in pressure produced by the compressor means; and,
means for determining output member rotational speed of the motor means from frequency of the sensed pulsations.

* * * * *